United States Patent [19]
Kondo et al.

[11] Patent Number: 5,049,990
[45] Date of Patent: Sep. 17, 1991

[54] HIGHLY EFFICIENT CODING APPARATUS

[75] Inventors: Tetsujiro Kondo; Atsuo Yada, both of Kanagawa, Japan

[73] Assignee: Sony Corporation, Tokyo, Japan

[21] Appl. No.: 553,333

[22] Filed: Jul. 17, 1990

[30] Foreign Application Priority Data

Jul. 21, 1989 [JP] Japan .................. 1-189888

[51] Int. Cl.$^5$ ............................ H04N 7/12
[52] U.S. Cl. .................. 358/133; 358/135; 358/136; 358/426
[58] Field of Search ............ 358/133, 135, 136, 138, 358/426, 432, 433; 382/56

[56] References Cited

U.S. PATENT DOCUMENTS

| | | | |
|---|---|---|---|
| 4,217,609 | 8/1980 | Hatori et al. | 358/136 |
| 4,562,468 | 12/1985 | Koga | 358/136 |
| 4,703,352 | 10/1987 | Kondo | 358/433 |
| 4,722,003 | 1/1988 | Kondo | 358/135 |
| 4,845,560 | 7/1989 | Kondo et al. | 358/134 |
| 4,890,161 | 12/1989 | Kondo | 358/135 |

Primary Examiner—Leo H. Boudreau
Assistant Examiner—Steven P. Fallon
Attorney, Agent, or Firm—Alvin Sinderbrand; William S. Frommer

[57] ABSTRACT

In a highly efficient coding apparatus, for coding digital video data in a block format and allowing video data compression for transmission using a data transmitter having a predetermined transmission capacity; maximum and minimum values of the digital video data of plural picture elements in a block are detected, the digital video data having values between the maximum value and a first value which is a first predetermined level lower than the maximum value are averaged for generating a modified maximum value, the digital video data having values between the minimum value and a second predetermined level higher than the minimum value are averaged for generating a modified minimum value, the modified minimum value is subtracted from the digital video data for each of the picture elements to generate modified digital video data, modified dynamic range information is generated from the modified maximum and minimum values, an encoding bit number is determined for each block during a predetermined period from the predetermined transmission capacity of the data transmitter, the modified digital video data is subjected to edge-match encoding with the encoding bit number, and an output of the encoder, a first additional code for each block formed of at least two of the modified maximum and minimum values and a signal based on the modified dynamic range information, and a second additional code for each predetermined period referred to above are transmitted.

10 Claims, 20 Drawing Sheets

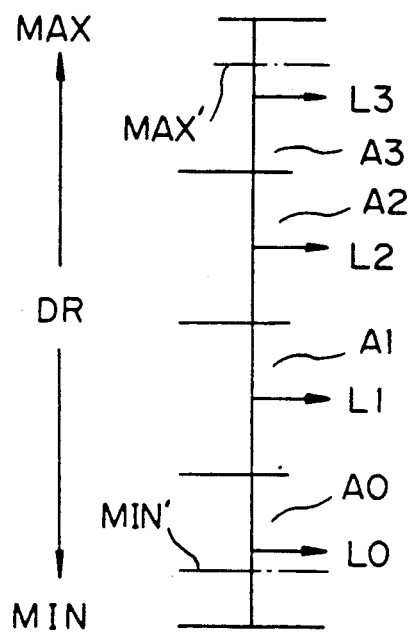
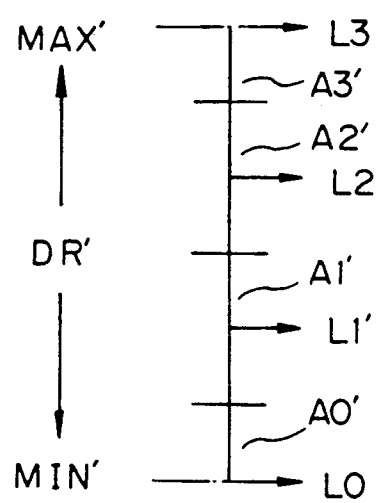
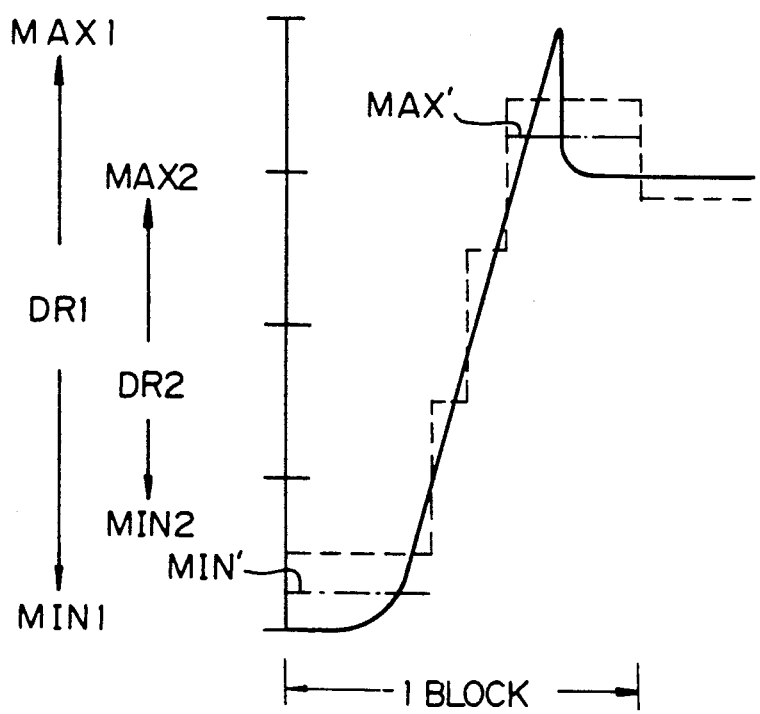

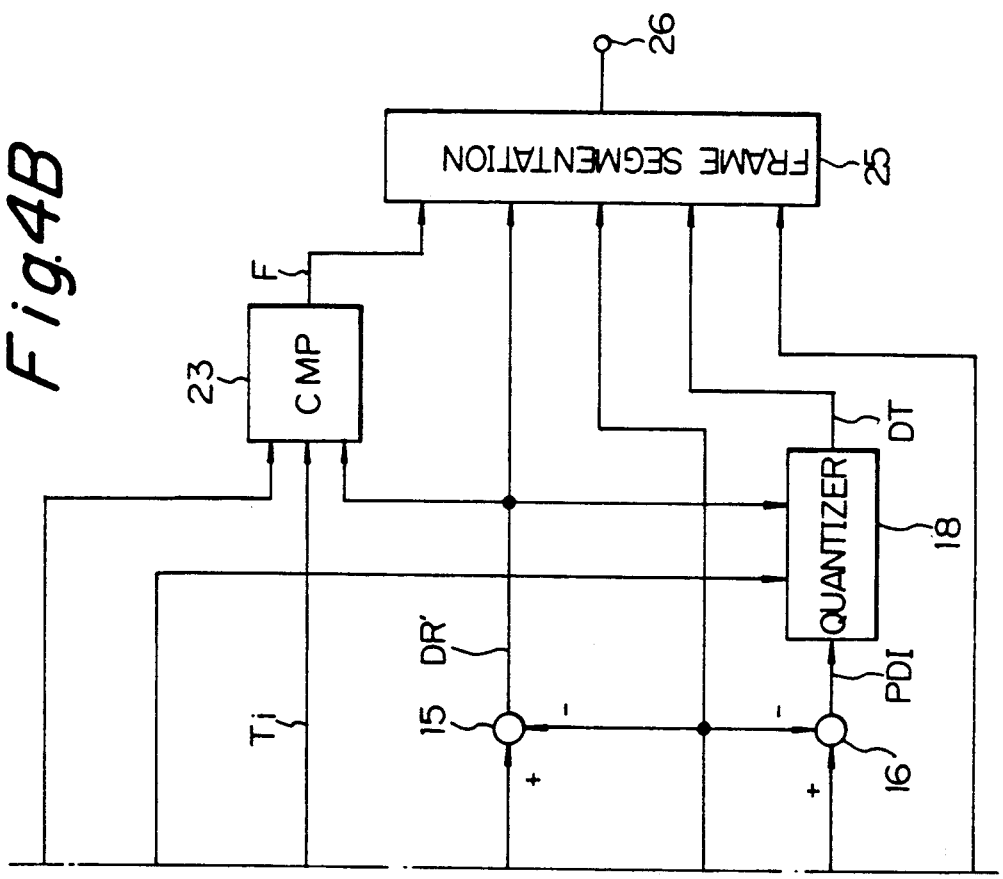

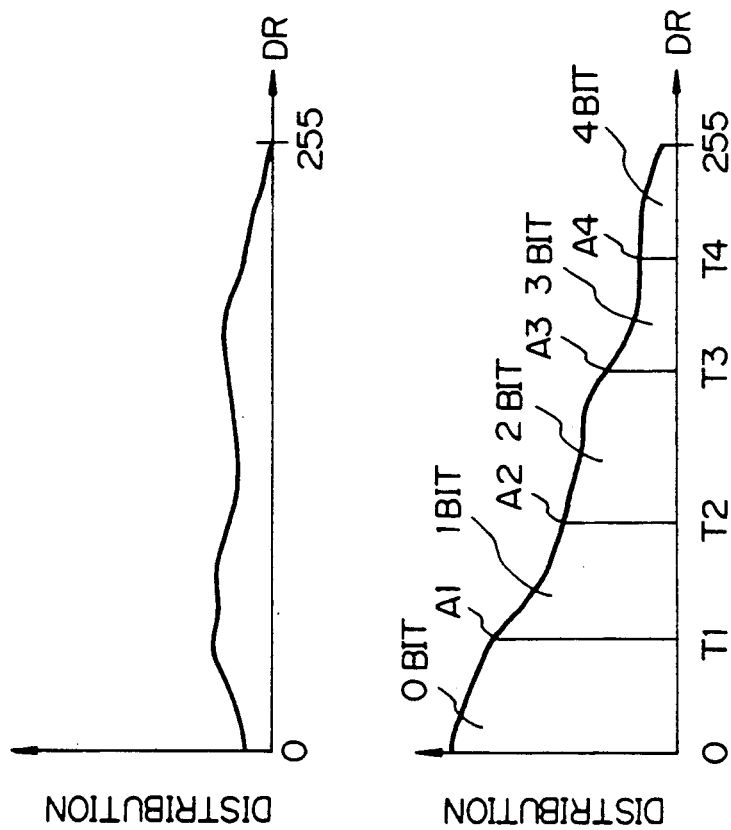

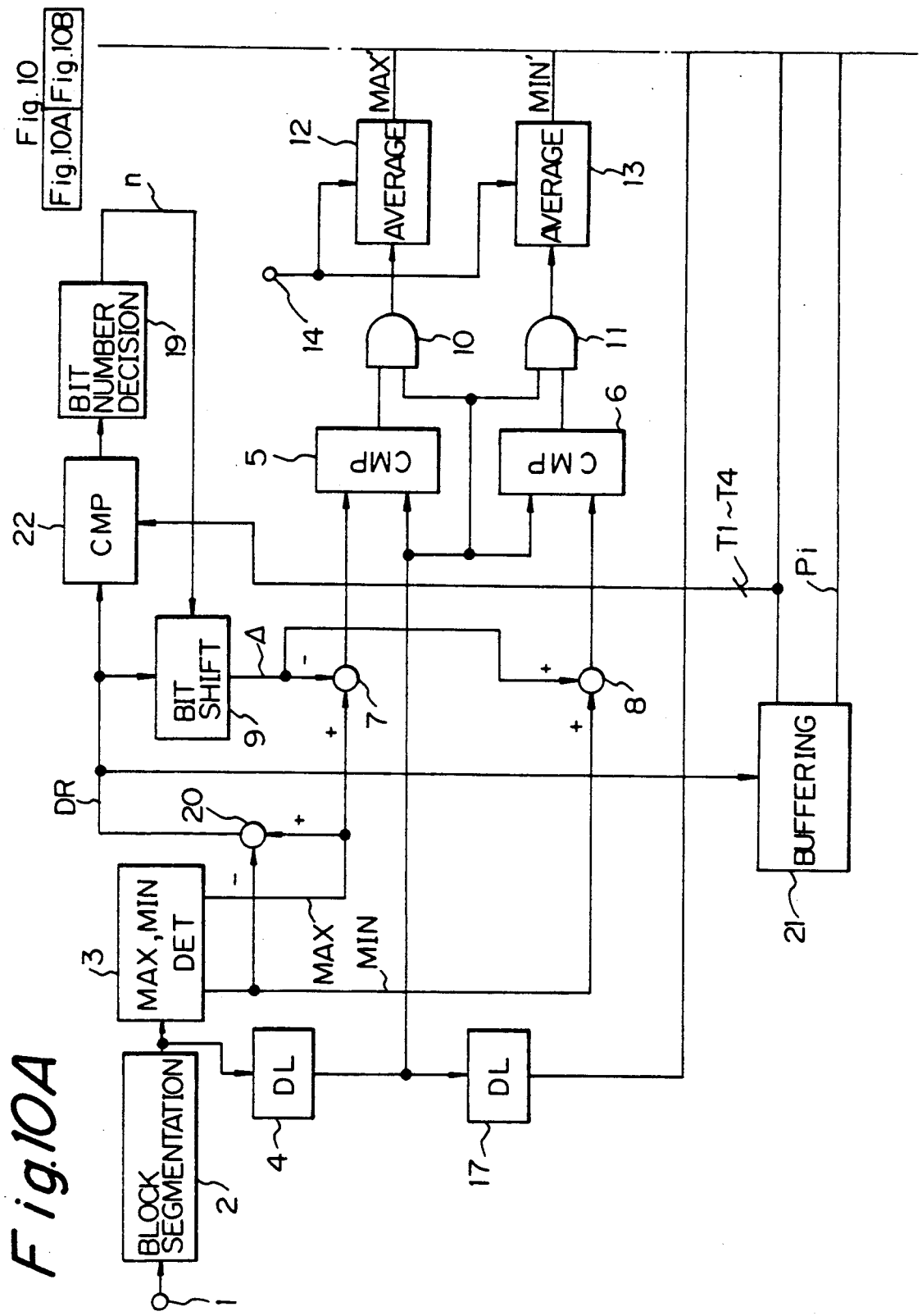

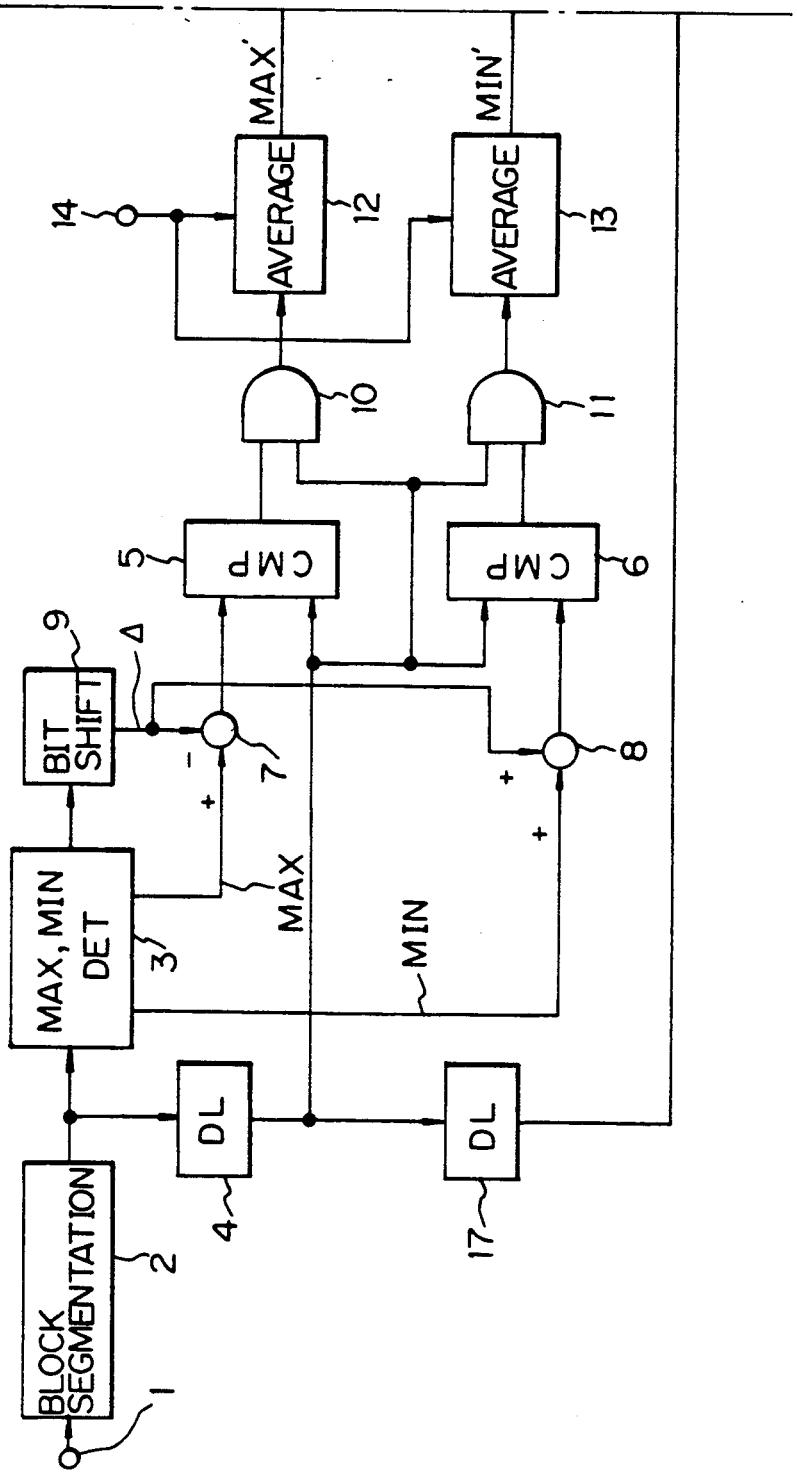

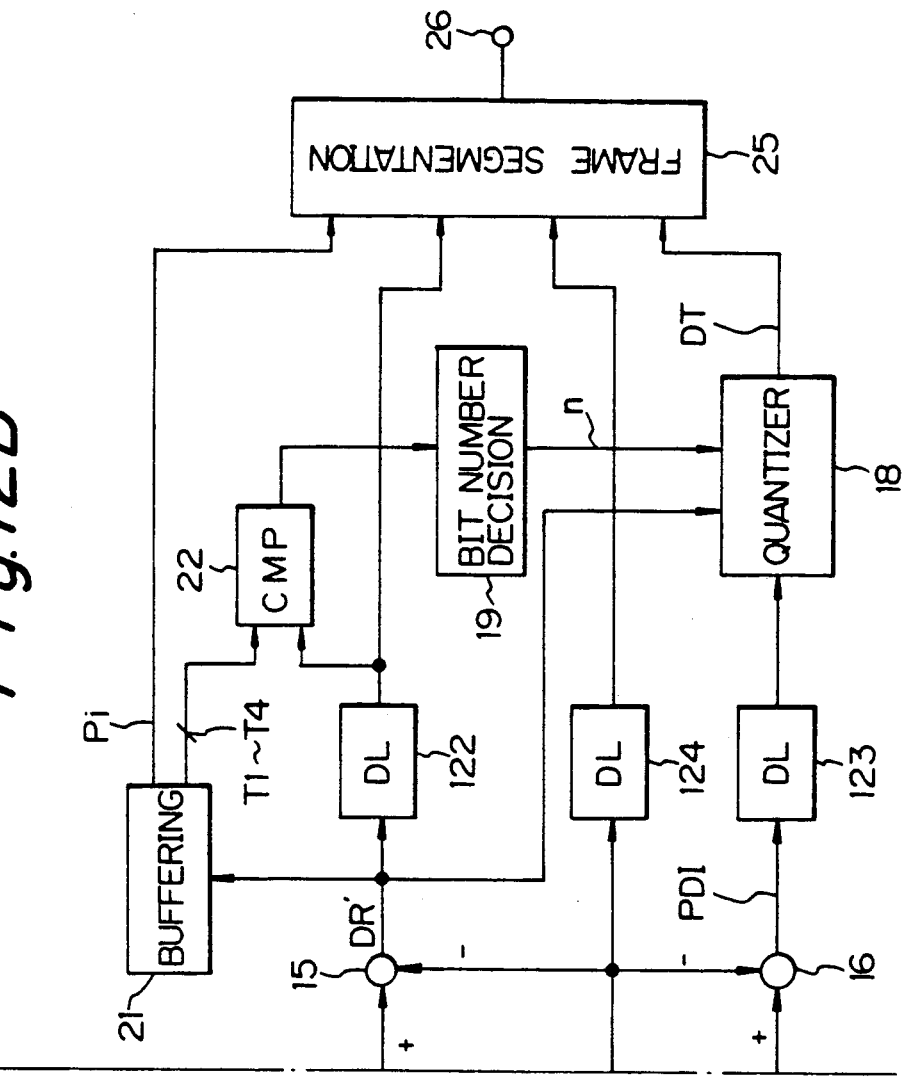

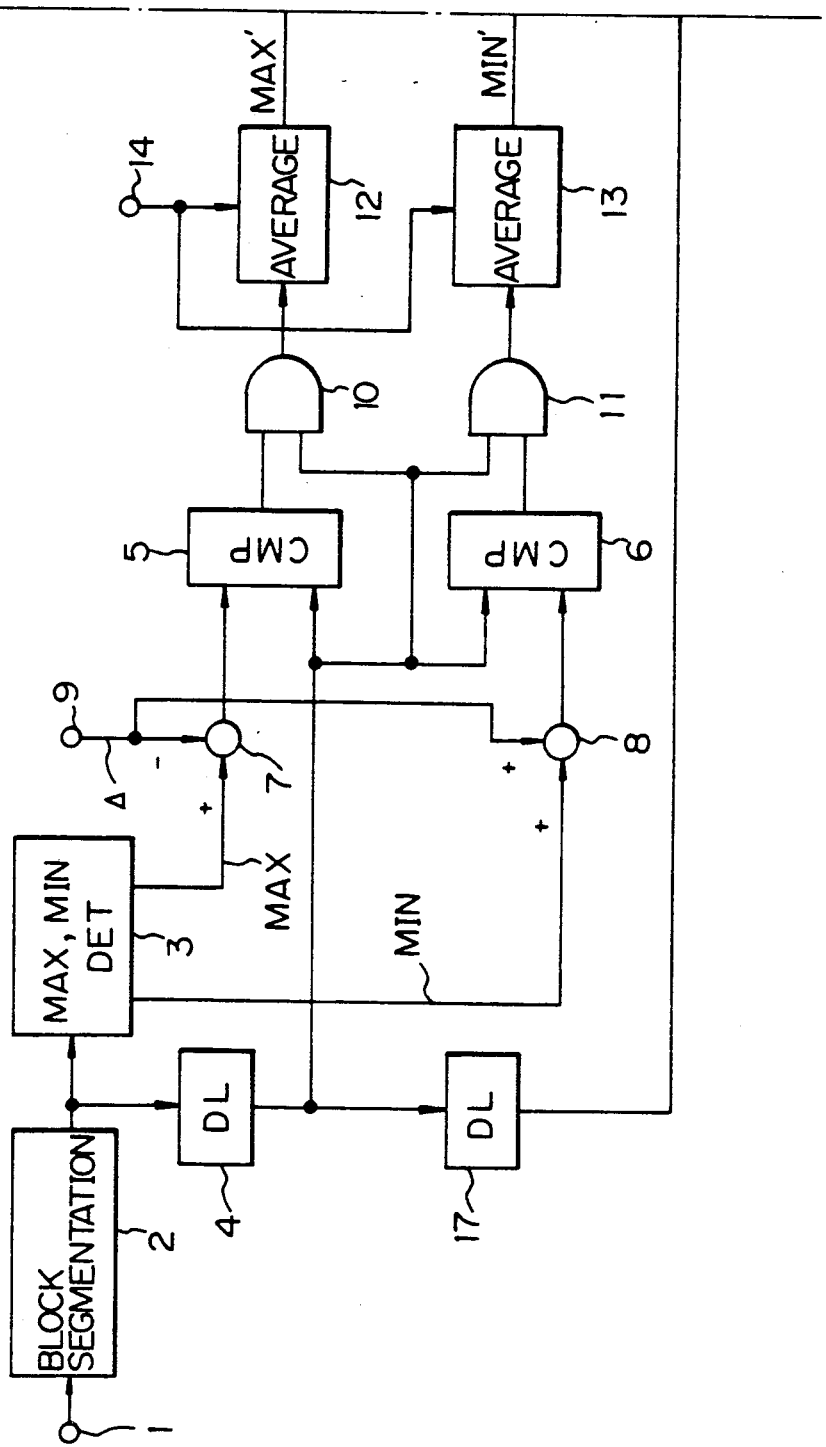

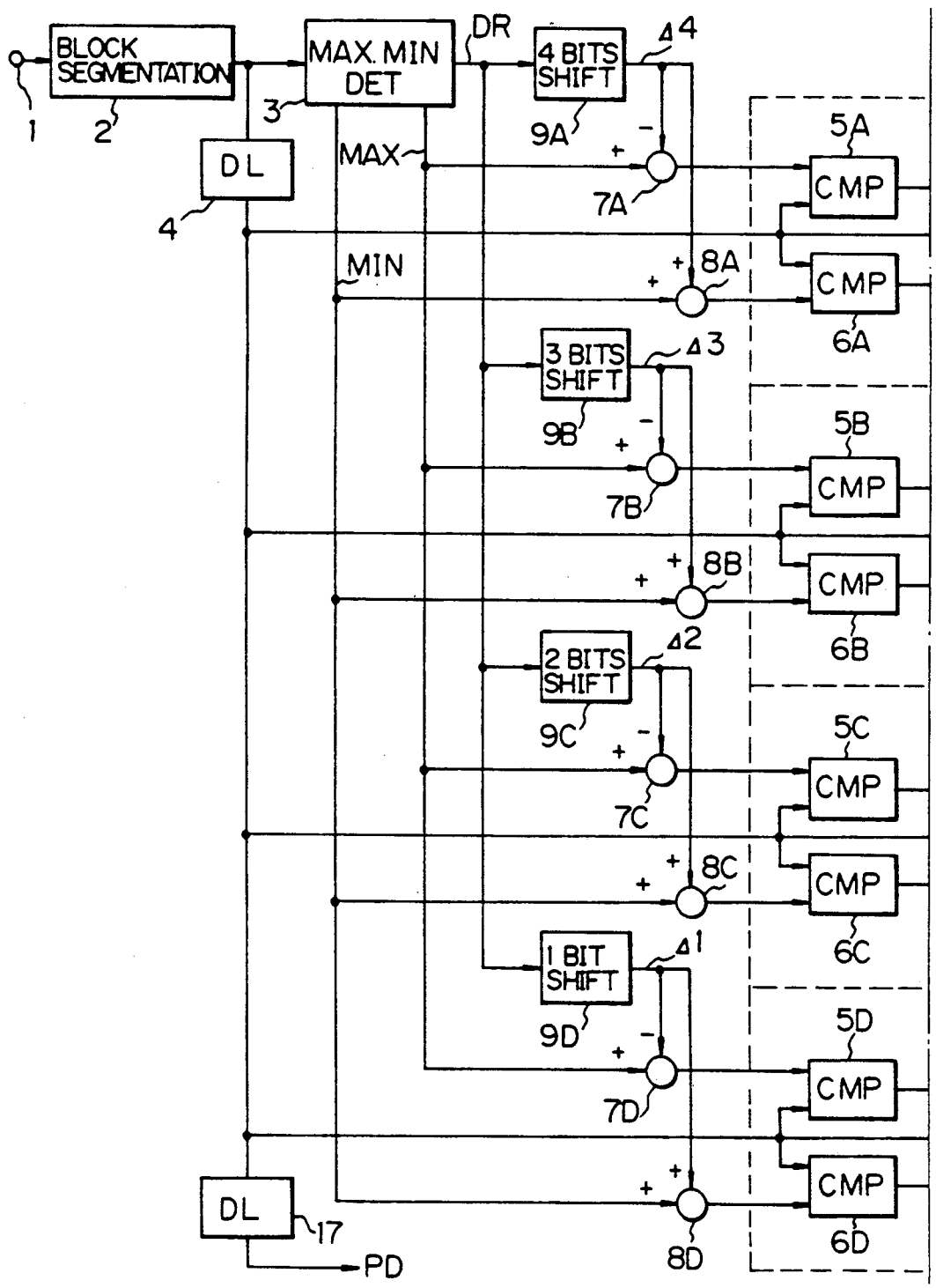

HIGHLY EFFICIENT CODING APPARATUS

BACKGROUND OF THE INVENTION

1. Field of the Invention

This invention relates to data communications and, more particularly, is directed to a highly efficient coding apparatus for compressing the number of bits of data required for each picture element of a digital television signal or the like.

2Description of the Prior Art

Among known methods of video signal coding, there are some highly efficient coding methods adapted to diminish the average bit number or sampling frequency of each picture element for purposes of narrowing the transmission band.

Applicants' Japanese Laid Open Patent Publication No. 61-144,989 discloses a highly efficient coding apparatus for determining a dynamic range from maximum and minimum values of a plurality of picture elements contained in a two-dimensional block and for performing a coding adapted to the dynamic range thus obtained. Further, Japanese Laid Open Patent Publication No. 62-92620 discloses a highly efficient coding apparatus for effecting coding adapted to a dynamic range determined with respect to a three-dimensional block formed of picture elements contained in areas of a plurality of frames. Moreover, Japanese Laid Open Patent Publication No. 62-128621 discloses a variable-length coding method for varying the quantization bit number as a function of the dynamic range so as to keep constant the maximum distortion occurring at the time of quantization.

Reference will be made to FIG. 1 in explaining a known adaptive dynamic range coding (ADRC) method. The dynamic range DR (difference between a maximum value MAX and a minimum value MIN) is calculated for every two-dimensional block formed of, for example, (8 lines × 8 pixels = 64 pixels). The minimum level (minimum value) is removed from the input pixel data in the block. After removal of the minimum value, each picture element (pixel) is converted into a representative level. This quantization is for dividing the detected dynamic range DR into four level ranges A0 to A3 corresponding to a number of bits less than the bit number that would be required for an original quantization of the pixel data. Upon transmission, each pixel in the block is represented by a code signal indicative of the respective level range.

In FIG. 1, the dynamic range DR of the block is divided into four level ranges A0 to A3. Pixel data contained in the minimum level range A0 are coded as (00), pixel data contained in the level range A1 are coded as (01), pixel data contained in the level range A2 are coded as (10), and pixel data contained in the maximum level range A3 are coded as (11). Therefore, picture element data of 8 bits are compressed into 2 bits for efficient transmission.

In a receiver, such a received code signal is decoded into one of a plurality of representative levels L0 to L3 which are center levels of the level ranges A0 to A3, respectively.

The above described adaptive dynamic range coding method is disadvantageous in that a block distortion occurs because of a ringing or an impulsive noise as will be described with reference to FIG. 2. In FIG. 2, for the purpose of simplifying the explanation, variation in data in respect of a one-dimensional block, i.e., a block formed of a predetermined number of samples in a horizontal line or direction, is shown as an analog waveform, and values decoded by the receiver are shown by a broken line.

A low-level ringing is often produced in a picture output of a video camera near an edge where the level is changed abruptly, as shown in FIG. 2. In the block including such ringing, a peak value of the ringing is detected as a maximum value MAX1, and coding is carried out adaptively with reference to a dynamic range DR1 between the maximum value MAX1, and a minimum value MIN1. In a subsequent block, in which the ringing is converged, the maximum value is decreased to MAX2, and coding is effected adaptively with reference to a dynamic range DR2 between a minimum value MIN2 and the maximum value MAX2. Therefore, a difference in luminance level is indicated between these two blocks and this causes a block distortion. Also in the case of an impulsive noise, a block distortion occurs for the same reason. The difference in luminance level causing the block distortion is small but nevertheless is visually noticeable.

In order to overcome the problem of block distortion caused by a ringing or an impulsive noise, the present applicants have proposed a system for performing preliminary processing of input data converted into a block structure for example, as described in the Japanese Laid Open Patent Publication No. 63-59187. More specifically, an average value MAX' of the values of input data contained in a maximum level range (A3 in FIG. 1) and an average value MIN' of the input data contained in a minimum level range (A0 in FIG. 1) are detected, and then quantization is carried out so as to convert the average value MAX' and the minimum value MIN' into detected levels L3 and L0, respectively, as shown in FIG. 3. The quantization shown in FIG. 1 in which the representative levels L0 to L3 do not include the maximum value MAX and the minimum value MIN but indicate center values in respective level ranges, is called a non-edge matching. In contrast, the quantization shown in FIG. 3 in which the levels L0 to L3 do include the average values MAX' and MIN', is called an edge matching.

In the ADRC method which involves first performing the preliminary non-edge matching processing and then subsequently performing the edge matching quantization, the maximum value is converted into the average value MAX' and not into the ringing peak in a block including the ringing shown in FIG. 2. Similarly, the minimum value is converted into MIN'. Since the edge matching quantization is carried out in respect to the concealed dynamic range DR' determined by the values MAX' and MIN', the difference between the decoded level of a specific block including a ringing and a decoded level of an adjacent block is reduced, and generation of block distortion is prevented.

Since the above-described adaptive to a dynamic range coding (ADRC) method can largely compress the amount of data to be transmitted, it is suitable for use in a digital VTR. Although variable-length ADRC can increase the compression rate, variable-length ADRC causes variation in the amount of transmitted data with the contents of the picture, so that a buffering process is required when using a transmission path having a fixed rate, such as, a digital VTR configured to record a predetermined amount of data in each track.

A buffering system for variable-length ADRC has been proposed by the present applicants, for example, as disclosed in Japanese Laid Open Patent Publication No. 63-111781. In this system, an integrating type frequency distribution table of dynamic ranges is formed and a threshold value is preliminarily obtained from the frequency distribution table for determining an assigned bit number, whereupon the generated amount of information in a predetermined period, such as one frame period, is obtained, so that the generated information amount does not surpass a target value.

When using variable-length ADRC in the above-mentioned ADRC method which involves preliminary processing using the non-edge matching quantization and subsequent performing of the edge matching quantization, a problem arises by reason of mismatching between the encoder and the decoder because, while the assigned bit number is established based on an original dynamic range DR, a different dynamic range DR' is transmitted to the receiver side.

More specifically, in order to control the generated information amount, a frequency distribution table for a predetermined period, e.g., one frame period, of dynamic ranges DR is prepared, and the frequency distribution table is converted into an integrating type frequency distribution table to which threshold values T1, T2, T3 and T4 (T1<T2<T3<T4) are adapted. In case of (DR<T1), the assigned bit number n is set at 0 (this means that no code signal is transmitted). In case of (T1≦DR<T2), the assigned bit number is set at (n=1). In case of (T2≦DR<T3), the assigned bit number is set at (n=2). In case of (T3<=DR<T4), the assigned bit number is set at (n=3). In case of (T4=<DR), the assigned bit number is set at (n=4).

As described above, for the relationship of (MAX'−MIN'=DR'), quantization is performed in respect to the concealed dynamic range DR', and the dynamic range DR' is transmitted. If the relationships of (T2<DR<T3) and (T2 DR'<T3) are established for the dynamic range of a certain block, the bit number (n=2) set at the encoder also exhibits (n=2) at the decoder, and no problem occurs. However, since the relationship of (DR>DR') exists, the decoder may erroneously regard the bit number as being (n=1) in the case of T1≦DR'<T2), and this causes a problem in that proper decoding is not effected.

OBJECTS AND SUMMARY OF THE INVENTION

It is, therefore, an object of the invention to provide a highly efficient coding apparatus which prevents mismatching between bit numbers used in encoding and decoding by reason of a difference between an original dynamic range and a concealed dynamic range which is transmitted.

In order to achieve the above object, the invention proposes a highly efficient coding apparatus for coding digital video data in a block format allowing video data compression for transmission using a data transmitter having a predetermined transmission capacity, the coding apparatus comprising a first detector for detecting a maximum value of the digital video data of plural picture elements in a block; a second detector for detecting a minimum value of the digital video data of plural picture elements in the same block; a first averaging circuit for averaging the digital video data having a value between the maximum value and a first value which is a first predetermined level lower than the maximum value, and for generating a modified maximum value; a second averaging circuit for averaging the digital video data having a value between the minimum value and a second value which is a second predetermined level higher than the minimum value, and for generating a modified minimum value; a subtracter for subtracting the modified minimum value from the digital video data for each of the picture elements to generate modified digital video data; a circuit for generating modified dynamic range information from the modified maximum and minimum values; a bit number deciding circuit for determining an encoding bit number for each block during a predetermined period from the predetermined transmission capacity of the data transmitter; an edge-match encoder for encoding the modified digital video data with the encoding bit number; and a transmission circuit for transmitting an output of the encoder, a first additional code for each block formed of at least two of the modified maximum and minimum values and a signal based on the modified dynamic range information, and a second additional code for each predetermined period referred to above.

The features of this invention which are believed to be new are set forth with particularity in the appended claims. The invention itself, however, together with further objects and advantages thereof may best be understood by reference to the following description when taken in conjunction with the accompanying drawings.

BRIEF DESCRIPTION OF THE DRAWINGS

FIGS. 1, 2 and 3 are schematic diagrams to which reference is made in describing examples of quantization employed in prior art highly efficient coding apparatus, respectively;

FIGS. 9A and 9B are schematic diagrams showing distribution tables of dynamic range information;

FIGS. 10A and 10B are a block diagram of a transmitter according to a second embodiment of the invention;

FIGS. 12A, 12B, 13A and 13B are block diagrams of third and fourth embodiments of this invention, respectively;

FIGS. 14A1, 14A2 and 14B are a block diagram of fifth embodiment of this 10 invention;

DETAILED DESCRIPTION OF THE PREFERRED EMBODIMENTS

Figure 4:
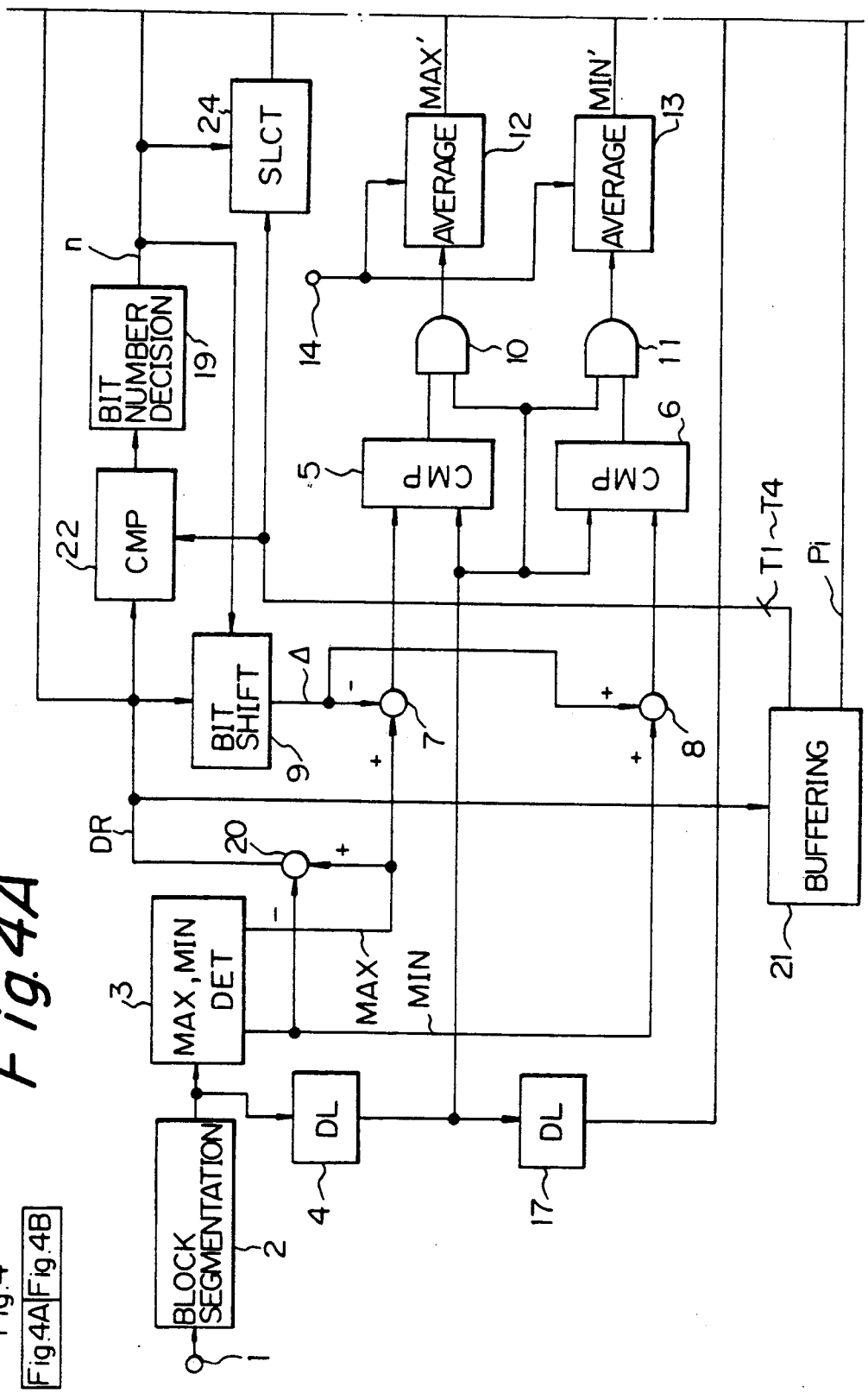
FIGS. 4A and 4B are a block diagram of a transmitter according to one embodiment of this invention.

FIGS. 4A and 4B, which together comprise FIG. 4, generally show the arrangement of a transmitter or recorder in accordance with a first embodiment of the invention. A digital video signal (digital luminance signal) in which one sample is quantized with eight bits, for example, is supplied through an input terminal 1 to a block segmentation circuit 2.

Figure 5:
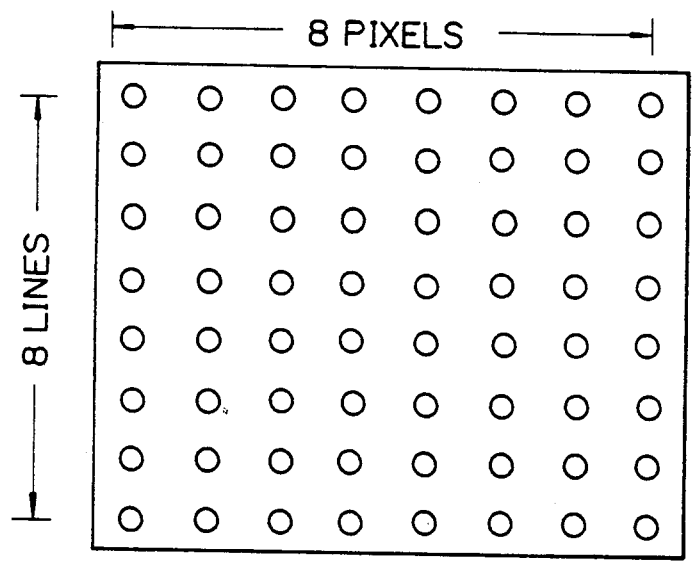
FIG. 5 is a schematic diagram of a block used as a unit in an encoding process in the transmitter of FIG. 4.

In the block segmentation circuit 2, the input digital video signal is converted into successive signals for each two-dimensional block which is the unit of coding. In this embodiment each block is 8 lines $\times$ 8 pixels $=64$ pixels, as shown in FIG. 5. An output signal of the block segmentation circuit 2 is supplied to a maximum/minimum value detector circuit 3 and a delay circuit 4. The maximum/minimum value detector 3 detects a minimum value MIN and a maximum value MAX of each block. The delay circuit 4 delays the input data by a time equivalent to that required for detecting the maximum value and the minimum value. Pixel data from the delay circuit 4 are supplied to comparator circuits 5 and 6.

The maximum value MAX from the maximum/minimum value detector 3 is fed to a subtracter circuit 7, and the minimum value MIN is supplied to an adder circuit 8. A value $\Delta$ equal to one quantization step width at the time of variable-length non-edge matching quantization is supplied from a bit shift circuit 9 to the subtracter 7 and the adder 8. The bit shift circuit 9 is configured to shift a dynamic range DR by n bits so as to perform subtraction of $(DR/2^n)$ when the assigned bit number is n. From the subtracter 7 is obtained a threshold value of $(MAX-\Delta)$, and from the adder 8 is obtained a threshold value of $(MIN+\Delta)$. These threshold vales from the subtracter 7 and the adder 8 are fed to the comparators 5 and 6, respectively.

An output signal of the comparator 5 is supplied to an AND gate 10, and an output signal of the comparator 6 is fed to an AND gate 11. The delayed pixel data from the delay circuit 4 are also supplied to the AND gates 10 and 11. The output signal of the comparator 5 represents a high level when the input data is larger than the threshold level $(MAX-\Delta)$. Therefore, at the output terminal of the AND gate 10, there is extracted that pixel data of the input data which is contained in the maximum level range of $(MAX \text{ to } MAX-\Delta)$. The output signal of the comparator 6 represents a high level when the input data is smaller than the threshold level $(MIN+\Delta)$. Therefore, at the output terminal of the AND gate 11 there is extracted that pixel data of the input which is contained in the minimum level range of $(MIN \text{ to } MIN+\Delta)$.

An output signal of the AND gate 10 is supplied to an averaging circuit 12, and an output signal of the AND gate 11 is fed to an averaging circuit 13. These averaging circuits 12 and 13 each calculate an average value for each block, and a reset signal is supplied at block intervals to the averaging circuits 12 and 13 from a terminal 14. From the averaging circuit 12 is obtained an average value MAX' of the pixel data belonging to the maximum level range of $(MAX \text{ to } MAX-\Delta)$, and from the averaging circuit 13 is obtained an average value MIN' of the pixel data belonging to the minimum level range of $(MIN \text{ to } MIN+\Delta)$. The average value MIN' is subtracted from the average value MAX' by a subtracter circuit 15 (FIG. 4B), and a concealed dynamic range DR' is obtained from the subtracter 15.

Further, the average value MIN' is supplied to a subtracter circuit 16 in which the average value MIN' is subtracted from the input data supplied to the subtracter 16 through a delay circuit 17, thereby forming data PD1. The data PD1 and the concealed dynamic range DR' are supplied to a quantizer circuit 18. This embodiment performs edge-match quantization which is a variable-length ADRC in which the bit number n assigned to the quantization is either 0 bit (no code signal is transmitted), 1 bit, 2 bits, 3 bits or 4 bits. The assigned bit number n is determined for each block by a bit number deciding circuit 19, and data representing such bit number n are supplied to the quantizer 18.

To the bit number deciding circuit 19 is supplied an output signal of a comparator circuit 22. The comparator 22 is supplied with the original dynamic range DR $(=MAX-MIN)$ from a subtracter circuit 20, and threshold values T1 to T4 $(T1<T2\ T3<T4)$ from a buffering circuit 21. The assigned bit number n is determined on the basis of the relationship between the magnitude of the dynamic range DR and the magnitudes of the threshold values T1 to T4.

The variable-length ADRC can perform efficient coding by decreasing the assigned bit number n in blocks in which the dynamic range DR is smaller and by increasing the assigned bit number n in blocks where the dynamic range DR is larger. More specifically, in a block in which $DR<T1$, the bit number n is set as 0 and no code signal is transmitted, and the dynamic range DR' and the average value MIN' alone are transmitted. In blocks in which $T1 \leq DR<T2$, the bit number is set as $(n=1)$. In blocks in which $T2 \leq DR<T3$, the bit number is set as $(n=2)$. In blocks in which $T3 \leq DR<T4$, the bit number is set as $(n=3)$. In blocks in which $DR \geq T4$ the bit number is set as $(n=4)$. The assigned bit number n determined in this manner and the concealed dynamic range DR' are supplied to the quantizer 18, and edge-match quantization is carried out.

In such variable-length ADRC, the amount of generated information can be controlled (so-called buffering) by varying the threshold values T1 to T4. Therefore, variable-length ADRC may be adapted to a transmissions path, e.g. a digital VTR, which requires that the amount of generated information for each field or each frame be maintained at a predetermined value.

In FIG. 4, reference numeral 21 designates a buffering circuit which determines the threshold values T1 to T4 for limiting the generated information amount to a predetermined value. In the buffering circuit 21, a plurality of, for example, 32 sets of threshold values (T1, T2, T3 and T4) are prepared as will be referred to later, and these sets of threshold values are discriminated or identified by a parameter code Pi $(i=0, 1, 2, \ldots, 31)$. As the number i of the parameter code Pi increases, the amount of generated information decreases. However, as the amount of generated information decreases, the decoded picture quality is deteriorated.

In the comparator 22 to which threshold values T1 to T4 from the buffering circuit 21 and the dynamic range DR from the subtracter circuit 20 are applied, respective threshold values are compared with the dynamic range DR, and comparison outputs are supplied to the bit number deciding circuit 19 which determines therefrom the assigned bit number n of the block. In the quantizer 18, the data PD1, from which the minimum value MIN' has been removed, is converted into a code signal DT by edge-match quantization using the concealed dynamic range DR' and the assigned bit number n. The quantizer 18 is formed of, for example, a ROM.

A flag F is formed in a comparator circuit 23 for use at the receiver side in properly setting the assigned bit number n. The comparator circuit 23 is supplied with the original dynamic range DR, the concealed dynamic range DR' and a threshold value Ti selected by a selector 24. The selector 24 is supplied with the threshold values T1 to T4 formed in the buffering circuit 21 and information of the assigned bit number n from the bit number deciding circuit 19. A lower threshold value Ti for deciding the assigned bit number n of the block is selected by the selector 24. For example, in case of (n=2), the threshold value T2 is selected by the selector 24.

In the case of the relationship (DR ≧ Ti > DR') which causes a mismatching such that the bit number assigned on the part of the encoder is regarded as (n−1) with respect to the bit number n assigned on the part of the decoder, the comparator circuit 23 generates a flag F indicating "1", and when the described relationship is not established, it generates a flag F indicating "0".

In order to ensure that the variation of the assigned bit number caused by a difference between the original dynamic range DR and the concealed dynamic range DR' does not exceed 1 bit (that is, in order to prevent a variation of 2 bits), the threshold values T1 to T4 are set to satisfy the following relationship.

$$T2 \geq 2T1\ T3 \geq 6/8 \times T2,\ T4 \geq 6/14 \times T3$$

The concealed dynamic range DR', the average value MIN', the code signal DT, the parameter code Pi indicative of a specific set of threshold values, and the flag F are all supplied to a frame segmentation circuit 25. Data to be transmitted and which have been converted into serial data are taken out at an output terminal 26 of the frame segmentation circuit 25. In the frame segmentation circuit 25, a coding of an error correction code is carried out, if necessary, and a synchronizing signal is added.

Figure 6:
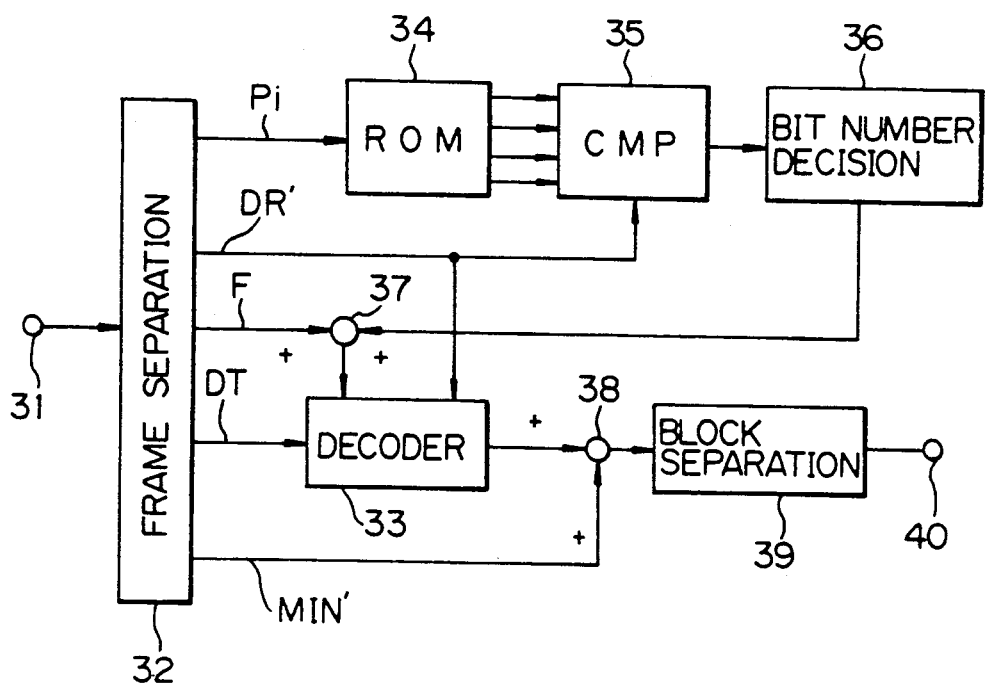
FIG. 6 is a block diagram of a receiver corresponding to the transmitter shown in FIG. 4.

FIG. 6 shows a construction of a receiver (or reproducer) which is complementary to the transmitter of FIG. 4. Received data from an input terminal 31 are fed to a frame separation circuit 32. The code signal DT and the added codes DR', MIN', Pi and F are separated from the received data and undergo an error correction processing in the frame separation circuit 32.

The code signal DT is fed to a decoder circuit 33, and the parameter code Pi is applied to a ROM 34. The ROM 34 generates a set of threshold values T1 to T4 indicated by the parameter code Pi, and the set of threshold values is supplied to a comparator circuit 35. The concealed dynamic range DR' is fed to the comparator circuit 35, and an output signal of the comparator circuit 35 is applied to a bit number deciding circuit 36. The bit number deciding circuit 36 decides an assigned bit number for the block based on the relationship between the concealed dynamic range DR' and the threshold values, and generates data corresponding to the bit number. An output of the bit number deciding circuit 36 is fed to an adder circuit 37 and there added to the flag F.

As described above, since the flag F represents "1" when the assigned bit number decided by the bit number deciding circuit 36 is less by 1 bit than that assigned on the part of the encoder by the bit number deciding circuit 19, a proper assigned bit number is obtained at the output of the adder circuit 37. The proper assigned bit number from the adder circuit 37 and the concealed dynamic range DR' are fed to the decoder 33. The average value MIN' is applied to an adder circuit 38. The adder 38 is supplied with an output signal of the decoder 33, and an output signal of the adder 38 is applied to a block separation circuit 39. The decoder 33 carries out a processing opposite to the processing performed by the quantizer 18 in the transmitter. More specifically, in the decoder 33, the code signal DT is decoded into a plurality of representative levels each including MAX' and MIN', and the resulting data and the average value MIN' of 8 bits are added by the adder 38, thereby to decode the original pixel data.

The output signal of the adder 38 is fed to the block separation circuit 39. The block separation circuit 39 is a circuit which, contrary to the block segmentation circuit 2 in the transmitter, converts the decoded data in the order of blocks into a different order which is the same as the television signal scanning order. At an output terminal 40 of the block separation circuit 39 is obtained a decoded video signal.

Figure 7:
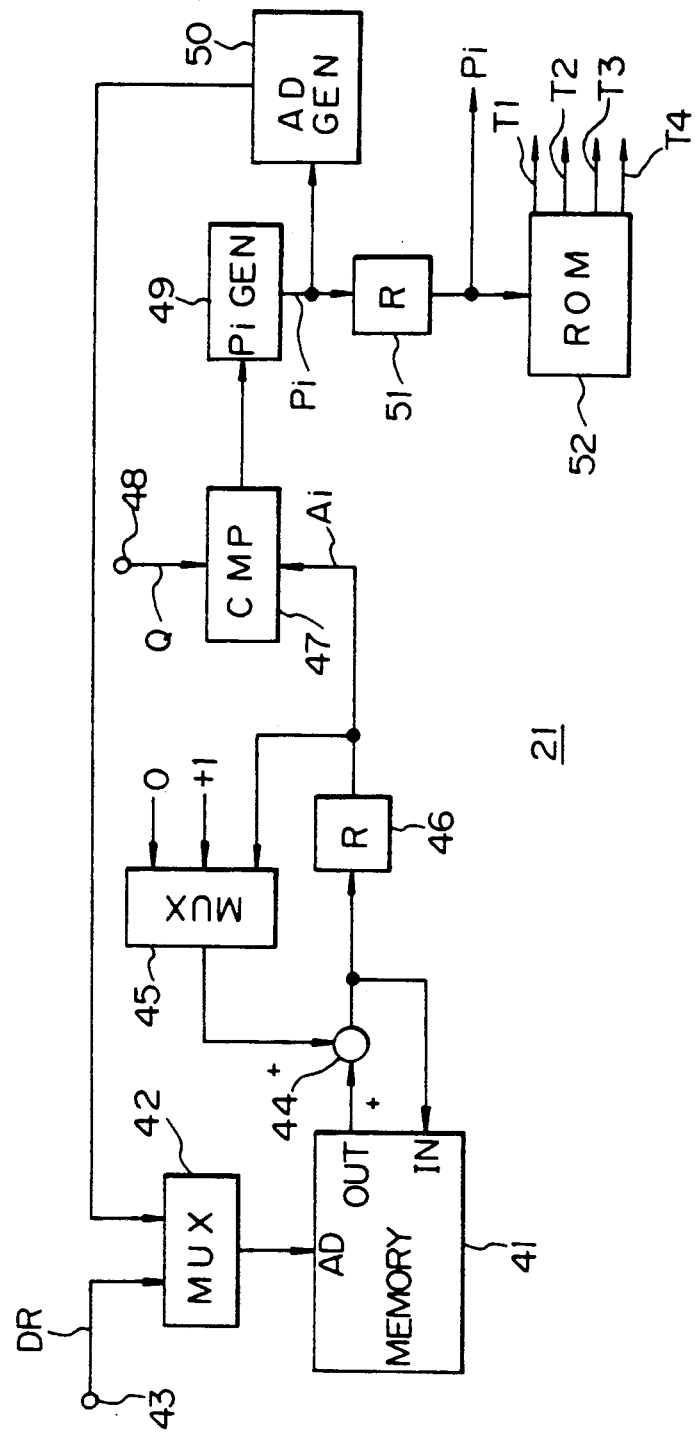
FIG. 7 is a block diagram of a buffering circuit included in the transmitter of FIG. 4.

FIG. 7 shows an example of the buffering circuit 21. In order to form a frequency distribution table and an integrating type frequency distribution table, a memory (RAM) shown at 41 is provided in the buffering circuit 21, and an address signal is supplied to the memory 41 via a multiplexer 42. The dynamic range DR is supplied from an input terminal 43 as one of the inputs to the multiplexer 42, and an address from an address generator circuit 50 is fed as the other input of the multiplexer 42. Data to be written in the memory 41 is supplied to an input thereof from an output of an adder circuit 44, and data read out of the memory 41 and an output of a multiplexer 45 are added in the adder circuit 44.

The output of the adder circuit 44 is fed to a register 46, and an output of the register 46 is supplied to the multiplexer 45 and to a comparator circuit 47. The multiplexer 45 is supplied with data representing 0 and +1 in addition to the output of the register 46. When an operation for computing the amount of generated information is carried out, an information amount Ai generated in one frame period, for example, is obtained at the output of the register 46.

The generated information amount Ai and a target value Q from a terminal 48 are compared in the comparator 47, and an output signal of the comparator 47 is fed to a parameter code generator circuit 49. The parameter code Pi from the parameter code generator 49 is applied to the address generator 50 and a register 51. The parameter code Pi output from the register 51 is fed not only to the frame segmentation circuit 25, as described before, but also to a ROM 52. The ROM 52 generates a set of threshold values (T1$i$, T2$i$, T3$i$ and T4$i$) corresponding to the parameter code Pi entered in the ROM as an address. The threshold values are fed to the comparator 22 as described before.

Figure 8:
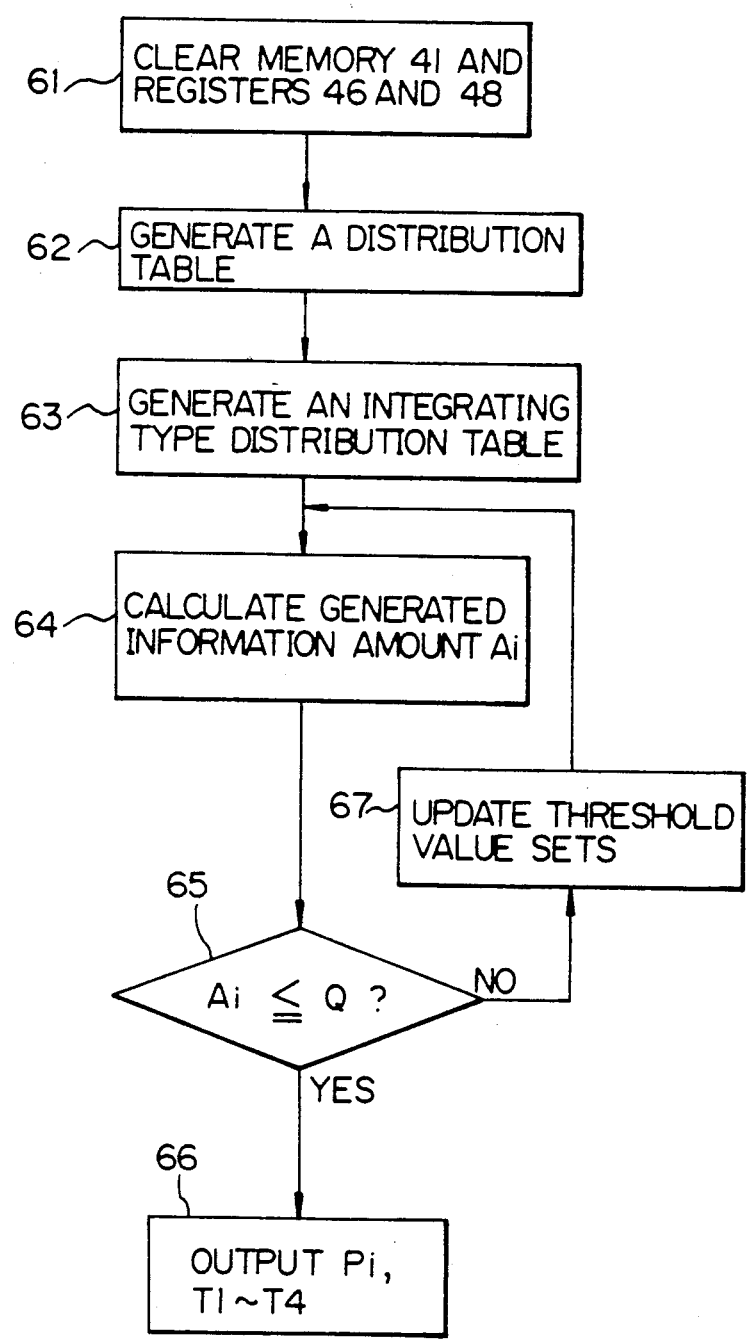
FIG. 8 is a flow chart for use in explaining the operation of the buffering circuit of FIG. 7.

FIG. 8 is a flow chart which shows an operation of the buffering circuit 21. In the first step shown at 61, the memory 41 and the register 46 are cleared to zero. Because of the zero clearance of the memory 41, the multiplexer 42 selects an address generated in the address generator 50, and the output of the adder circuit 44 is continuously held at zero. The address varies in the order of (0, 1, 2, ..., 255), and zero (0) data is written into all addresses of the memory 41.

In next step at 62, a frequency distribution table of dynamic ranges DR in one frame, which is a unit period for buffering, is formed in the memory 41. The multiplexer 42 selects the dynamic ranges DR from the terminal 43, and the multiplexer 45 selects +1. Therefore, when the one-frame period expires, occurrence frequencies of respective dynamic ranges DR are stored in respective addresses of the memory 41 corresponding to the dynamic ranges DR. An example of a frequency distribution table of the memory 41 is as shown in FIG. 9A, in which the DR is plotted along the abscissa and the frequency of occurrence of each DR is plotted along the ordinate.

Subsequently, in step 63, the frequency distribution table is converted into an integrating type frequency distribution table. For forming of the integrating type frequency distribution table, the multiplexer 42 selects an address from the address generator 50, and the multiplexer 45 selects the output of the register 46. The address signal supplied to the memory 41 sequentially decrements from 255 toward 0. The read-out output of the memory 41 is fed to the adder 44, and it is there added to the contents of the register 46 supplied through the multiplexer 45 to the adder 44. An output of the adder 44 is written into the same address of the memory 41 as the address from which reading is then occurring, and the contents of the register 46 are renewed by the output of the adder 44. Thus, the frequencies of occurrence of the several dynamic ranges DR are accumulated at the respective addresses of the memory 41. In the initial condition where the address of the memory 41 is 255, the register 46 is cleared into zero (0). An integrating frequency distribution table, for example, as shown in FIG. 9B, is formed in the memory 41 when occurrences are accumulated for all the addresses of the memory 41 as described above.

The amount of generated information $A_i$ at the time when the set of threshold values ($T1i$, $T2i$, $T3i$ and $T4i$) is adapted to the integrating type frequency distribution table is computed in step 64. For the computation of the generated information amount $A_i$, the multiplexer 42 selects the output of the address generator 50, and the multiplexer 45 selects the output of the register 46. The parameter code generator 49 generates a parameter code which sequentially varies from P0 to P31. The parameter code $P_i$ is fed to the address generator 50, and addresses corresponding to the respective threshold values ($T1i$, $T2i$, $T3i$ and $T4i$) are successively generated. Values read out of the addresses of the memory 41 corresponding to the respective threshold values are accumulated in the adder 44 and the register 46. This integrated value corresponds to the generated information amount $A_i$ at the time when the set of threshold values indicated by the parameter code $P_i$ is adapted. More specifically, in the integrating type frequency distribution table of FIG. 9B, the value which is obtained by multiplying the total value (A1+A2+A3+A4) of the respective values A1, A2, A3 and A4 read out of the addresses corresponding to the threshold values T1, T2, T3 and T4 by the number of picture elements (64) in the block is the generated information amount (bit number). However, since the number of picture elements is constant, the process of multiplying the total of A1+A2+A3+A4 by 64 is omitted in the buffering circuit 21 of FIG. 7.

In the next step 65, the comparator circuit 47 compares the generated information amount $A_i$ with the target value Q. An output of the comparator circuit 47 generated when the relationship ($A_i \leq Q$) is determined to exist in step 65 is fed to the parameter code generator 49. As a result, incrementing of the parameter code $P_i$ is stopped, and the parameter code $P_i$ is fed into the register 51. The parameter code $P_i$ from the register 51 and a corresponding set of threshold values generated in the ROM 52 are discussed in the next step 66.

If the relationship ($A_i \leq Q$) is not established in the judging step 65 by the comparator 47, the program returns to step 64 through a step 67 in which the parameter code $P_i$ is updated or changed into a subsequent code $P_i+1$ corresponding to an updated set of threshold values, and an address corresponding to $P_i+1$ is generated by the address generator 50. In the same manner as described above, a generated information amount $A_i+1$ is computed, and it is compared to the target value Q in the comparator 47. This operation is repeated until the relationship of ($A_i \leq Q$) is established.

In the above described embodiment of the invention, the code signal DT, the concealed dynamic range DR' and average value MIN' are transmitted. In lieu of the concealed dynamic range, the average value MAX' and a quantization step width may be transmitted as additional codes.

Figure 10B:
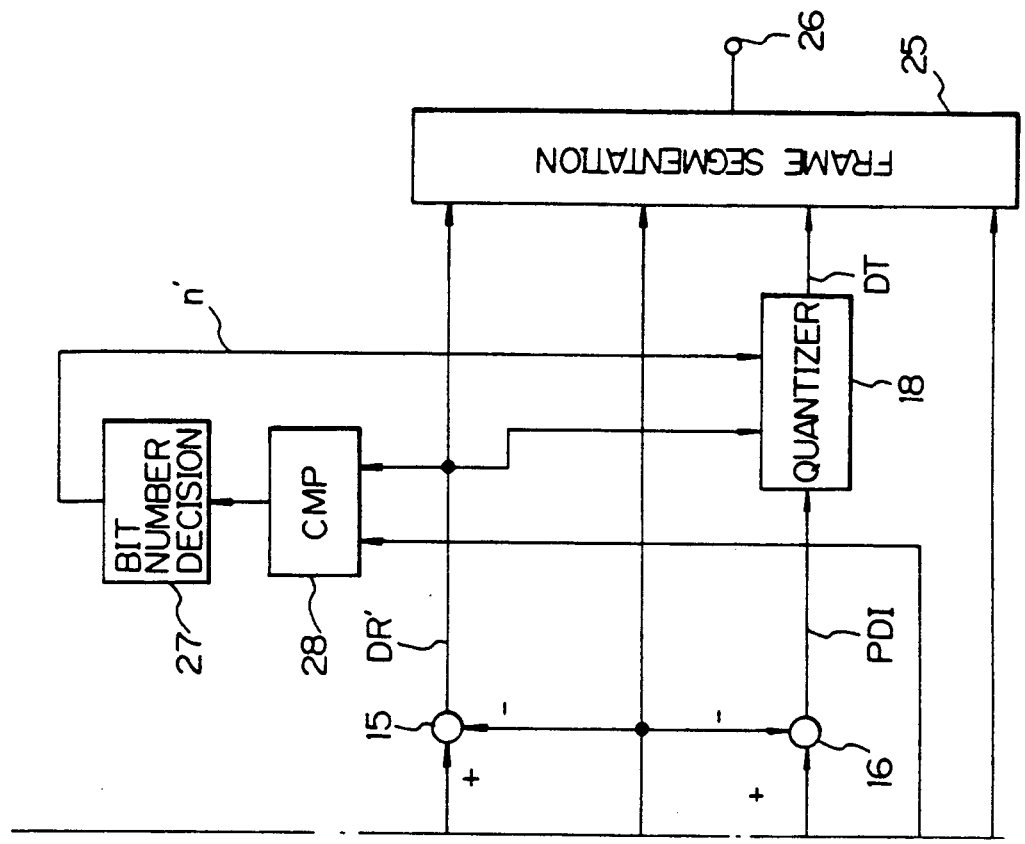

A second embodiment of the invention is described below, with reference to FIGS. 10A and 10B which together constitute FIG. 10 in which elements equivalent to those of the first embodiment of FIG. 4 are denoted by the same reference numerals and their detailed explanation is omitted accordingly.

In the embodiment of FIG. 4, the data PDI is quantized adaptively to the concealed dynamic range DR' according to the bit number n decided in the bit number deciding circuit 19. Therefore, under the above-indicated relationship between the original dynamic range DR and the concealed dynamic range DR', since mismatching occurs between the bit number n on the part of the transmitter and the bit number obtained on the part of the receiver by comparing the transmitted dynamic range DR' with the threshold value Ti generated on the basis of the transmitted parameter code $P_i$, a flag F is also transmitted to insure proper decoding.

In the second embodiment shown in FIG. 10, in order to omit transmission of the flag F, information concerning the threshold values T1 to T4 obtained by the buffering circuit 21 is compared with the concealed dynamic range DR' in a comparator circuit 28, and a bit number deciding circuit 27 decides a bit number n' for quantization on the basis of, a comparison output of the comparator 28, whereupon, the data PDI are quantized by the quantizer 18 according to the bit number n'. Under this arrangement, quantizing bit numbers employed in the transmitter and the receiver, respectively never fail to coincide, and transmission of the flag F is not necessary.

An arrangement in a receiver for receiving data transmitted from the transmitter of FIG. 10 is explained below with reference to FIG. 11 in which elements equivalent to those in the receiver shown in FIG. 6 are designated by the same reference numerals. As described above, since the transmitter shown in fig. 10 performs quantization using the bit number n' which is obtained by comparing the concealed dynamic range DR' with the threshold value information T1 to T4 obtained in the buffering circuit 21, the receiver can readily decode the quantizing bit number n' from the transmitted parameter code $P_i$ and the concealed dynamic range DR'. Decoding of the quantizing bit number n' is effected in a decoder circuit 33 in the arrangement of FIG. 11. Its detail, however, is omitted. Data DT are decoded based on the decoder bit number information n' and the dynamic range DR'. Other operations of the arrangement of FIG. 11 are equal to those of the arrangement of FIG. 6, and their detailed explanation is omitted.

A third embodiment of the invention is explained below with reference to FIG. 12 comprised of FIGS. 12A and 12B and in which some elements equivalent to those of FIGS. 4 and 10 are designated by the same reference numerals, and a detailed explanation thereof is omitted in the following description.

In the third embodiment of FIG. 12, edge-match quantization using a fixed bit number is first performed as a preliminary processing. After this, by averaging data belonging to the maximum and minimum bit planes, new values MAX' and MIN' are obtained. The quantizing bit number is decided by effecting a buffering based on a concealed dynamic range DR' obtained from the values MAX' and MIN'. Therefore, by performing fixed-bit shifting of a dynamic range DR of an output of the maximum/minimum detector 3 in the bit shift circuit 9, a value of one quantizing step width ($\Delta = 1/16$ DR) is obtained. Subsequent processings are the same as in the first and second embodiments. The concealed dynamic range DR' obtained in the subtractor 15 is supplied to the buffering circuit 21. The buffering circuit 21 in FIG. 12B may have the same arrangement as the buffering circuit shown in FIG. 7 and, its operation is the same as that explained with reference to the flow chart shown in FIG. 8. The threshold values T1 to T4 obtained in the buffering circuit 21 on FIG. 12B are supplied to the comparator 22 for comparison with the concealed dynamic range DR' supplied thereto through a delay circuit 122 and, based on an output of the comparator 22, the bit number deciding circuit 19 decides the quantizing bit number n. The quantizer 18 is responsive to the quantizing bit number n to quantize the data PDI after passing through a delay circuit 123 adaptively to the dynamic range DR'. As a result, quantized data DT are obtained. The quantized data DT, the average value MIN' delayed in a delay circuit 124, the concealed dynamic range DR' delayed by the delay circuit 122, and the parameter code Pi are supplied to the frame segmentation circuit 25. Delay circuits 122, 123 and 124 are used to delay respective signals by a time required for processing in the buffering circuit.

Figure 11:
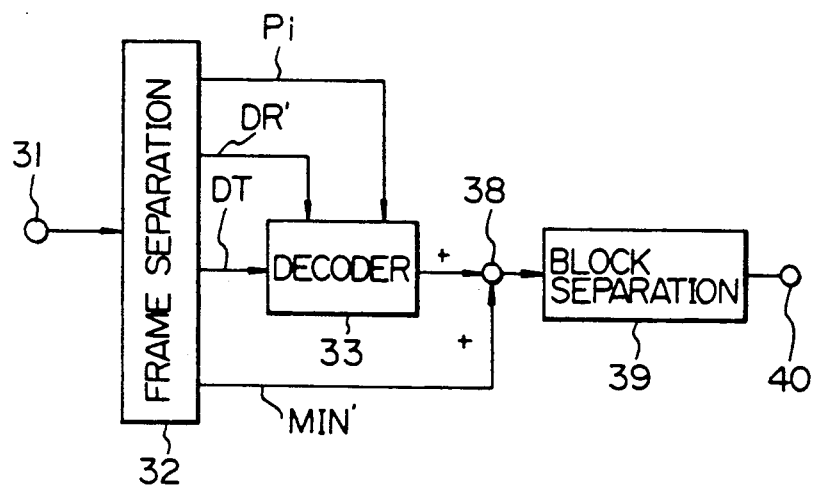
FIG. 11 is a block diagram showing a receiver corresponding to the transmitter shown in FIG. 10.

The same arrangement as that in the receiver apparatus shown in FIG. 11 may be employed for receiving data transmitted from the transmitter apparatus according to the third embodiment of FIG. 12.

Figure 13B:
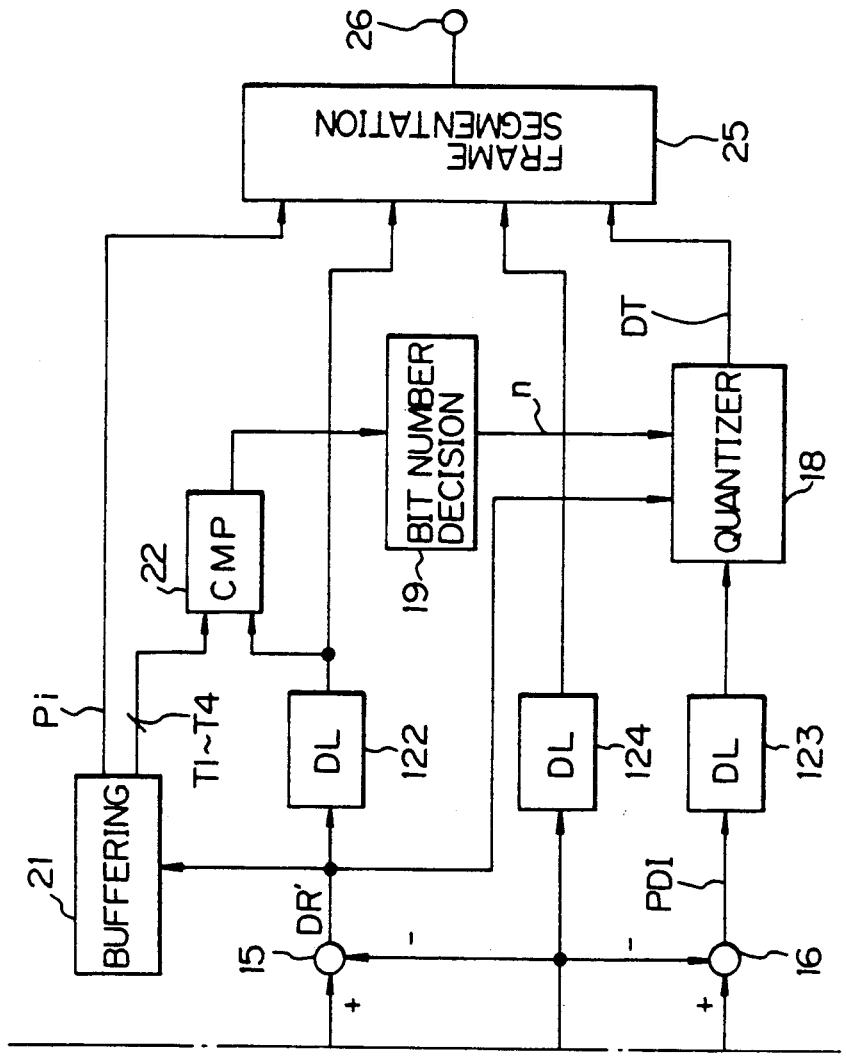

FIG. 13 shows a fourth embodiment which is basically analogous to the third embodiment of FIG. 12 except that, while the embodiment of FIG. 12 obtains the one quantizing step width $\Delta$ by fixed-bit shifting of the original dynamic range DR, the embodiment of FIG. 13 is configured to enter a fixed value $\Delta$ from a terminal 9 and to subtract that value $\Delta$ from the maximum value MAX and add the value $\Delta$ to the minimum value MIN. The fixed value $\Delta$ preferably corresponds to the noise level. Other arrangements and operations of the embodiment of FIG. 13 are the same as those in the embodiment of FIG. 12.

In the first embodiment of FIG. 4 heretofore referred to, flag information is required as additional information. In the second embodiment of FIG. 10, since the buffering itself is based on the original dynamic range and the quantizing bit number is decided upon from the resulting threshold value information and the concealed dynamic range DR' so that the quantization is performed accordingly, such a low efficiency may result that the actual information amount is greater than the allowable maximum information amount. In the third embodiment of FIG. 12 and in the fourth embodiment of FIG. 13, since non-edge matching quantization using the fixed bit number is performed as a preliminary processing regardless of any value of the original dynamic range DR, they are also not optimum from the viewpoint of efficiency.

A fifth embodiment removing these drawbacks is explained below with reference to FIGS. 14A and 14B which, although connected actually, are drawn separately on account of the limited area of each drawing sheet.

Figures 2, 14A:
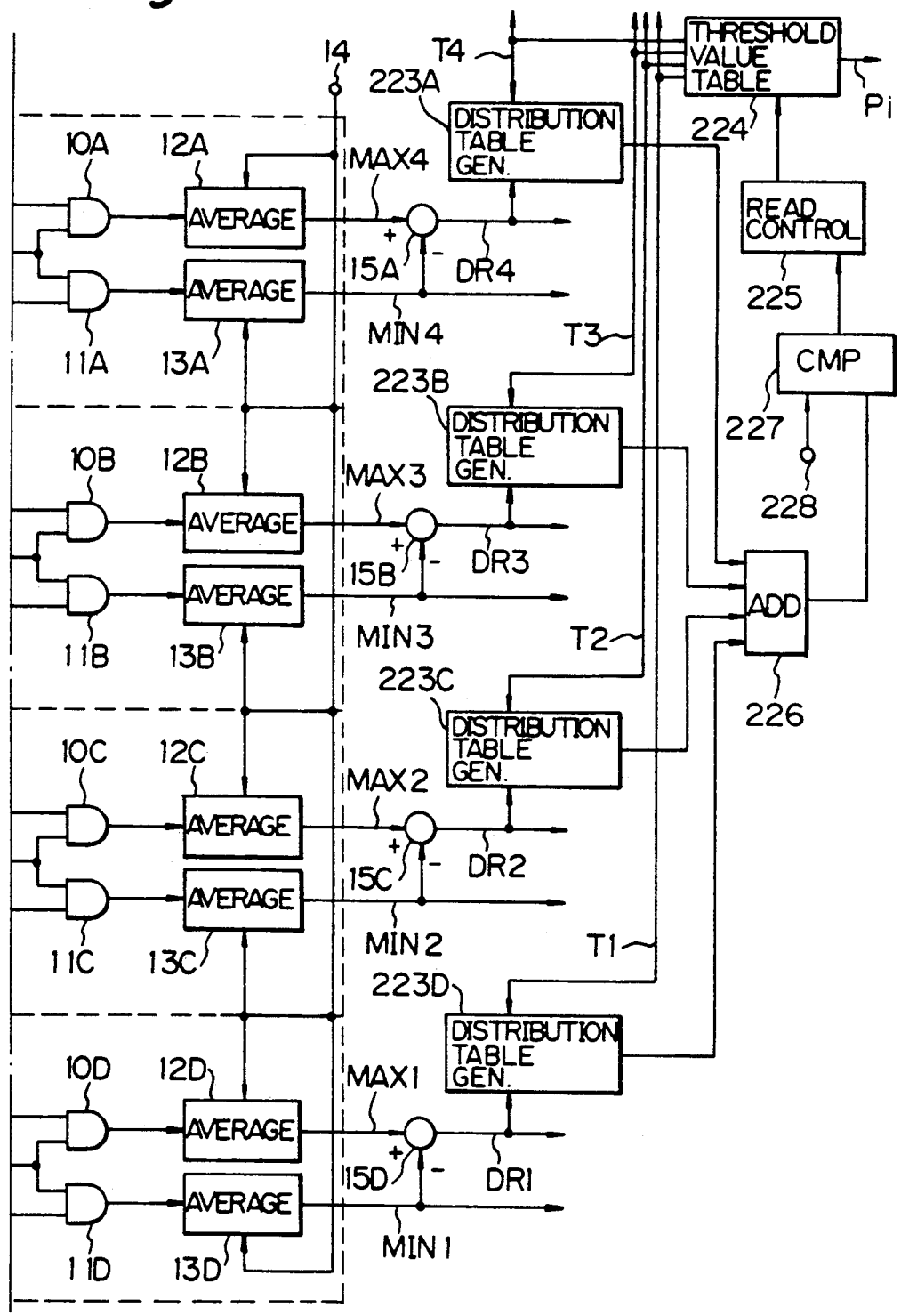

In FIG. 14A, a digital video signal (video luminance signal) in which one sample is quantized with eight bits, for example, is supplied through an input terminal 1 to a block segmentation circuit 2.

In the block segmentation circuit 2, the input digital video signal is converted into successive signals for each two-dimensional block which is the unit of coding. In this embodiment, each block is comprised of 8 lines $\times 8$ pixels $= 64$ pixels, as shown in FIG. 5. An output signal of the block segmentation circuit 2 is supplied to a maximum/minimum value detector circuit 3 and a delay circuit 4. The maximum/minimum value detector 3 detects a minimum value MIN and a maximum value MAX of each block. The delay circuit 4 delays the input data by a time required for detecting the maximum value and the minimum value. Pixel data from the delay circuit 4 are supplied to comparator circuits 5A, 5B, 5C and 5D and to comparator circuits 6A, 6B, 6C and 6D.

The maximum value MAX from the maximum/minimum value detector 3 is fed to subtracter circuits 7A, 7B, 7C and 7D and to adder circuits 8A, 8B, 8C and 8D. The subtracter circuits 7A, 7B, 7C and 7D and the adder circuits 8A, 8B, 8C and 8D are supplied from bit shift circuits 9A, 9B, 9C and 9D with values $\Delta 4 = 1/16 DR$, $\Delta 3 = 1/8 DR$, $\Delta 2 = 1/4 DR$ and $\Delta 1/2 DR$, respectively, of one quantization step width at the time of non-edge matching quantization using respective bit numbers, that is 4 bits, 3 bits, 2 bits and 1 bit, respectively. The bit shift circuits 9A, 9B, 9C and 9D are configured to shift a dynamic range DR by 4 bits, 3 bits, 2 bits and 1 bits, respectively, so as to perform these subtractions. From the subtracters 7A, 7B, 7C and 7D are obtained threshold values of $MAX - \Delta 4$, $MAX - \Delta 3$, $MAX - \Delta 2$ and $MAX - \Delta 1$, respectively, and from the adders 8A, 8B, 8C and 8D, threshold values of $MIN + \Delta 4$, $MIN + \Delta 3$, $MIN + \Delta 2$ and $MIN + \Delta 1$, respectively, are obtained. These threshold values from the subtracters 7A, 7B, 7C and 7D and from the adders 8A, 8B, 8C and 8D are fed to the comparators 5A, 5B, 5C and 5D and to comparator circuits 6A, 6B, 6C and 6D, respectively, for comparison therein with the pixel data from delay circuit 4.

Output signals of the comparators 5A, 5B, 5C and 5D are supplied to AND gates 10A, 10B, 10C and 10D, and output signals of the comparators 6A, 6B, 6C and 6D are fed to AND gates 11A, 11B, 11C and 11D, respectively. The pixel data from the delay circuit 4 is also supplied to the AND gates 10A, 10B, 10C and 10D and to the AND gates 11A, 11B, 11C and 11D. The output signals of the comparators 5A, 5B, 5C and 5D represent high levels when the input data from delay circuit 4 is larger than the threshold levels from subtracters 7A, 7B, 7C and 7D, respectively. Therefore, at the output terminals of the AND gates 10A, 10B, 10C and 10D are extracted the pixel data of the input data which are contained in the maximum level ranges of MAX to MAX$-\Delta 4$, MAX to MAX$-\Delta 3$, MAX to MAX$-\not=2$, and MAX to MAX$-\Delta 1$, respectively. The output signals of the comparators 6A, 6B, 6C and 6D represent low levels when the input data from delay circuit 4 is smaller than the levels from adder circuits 8A, 8B, 8C and 8D, respectively. Therefore, at the output terminals of the AND gates 11A, 11B, 11C and 11D are extracted the pixel data of the input data which are contained in the minimum level ranges of MIN to MIN$+\Delta 4$, MIN to MIN$+\Delta 3$, MIN to MIN$+\Delta 2$, and MIN to MIN $+\Delta 1$, respectively.

Output signals of the AND gates 10A, 10B, 10C and 10D are supplied to averaging circuits 12A, 12B, 12C and 12D, and output signals of the AND gates 11A, 11B, 11C and 11D are fed to averaging circuits 13A, 13B, 13C and 13D. These averaging circuits 12A, 12B, 12C, 12D, 13A, 13B, 13C and 13D each calculate an average value for each block, and reset signals appearing at the block intervals are supplied to the averaging circuits 12A, 12B, 12C, 12D, 13A, 13B, 13C and 13D from a terminal 14. From the averaging circuit 12A is obtained a maximum average value MAX4 of the pixel data belonging to the maximum level range of MAX to MAX$-\Delta 4$ and, from the averaging circuits 12B, 12C and 12D, there are obtained maximum average values MAX3, MAX2, and MAX1 of the pixel data belonging to the maximum level ranges of MAX to MAX$-\Delta 3$, MAX to MAX$-\Delta 2$, and MAX to MAX$-\Delta 1$, respectively. From the averaging circuits 13A, 13B, 13C and 13D are obtained minimum average values MIN4, MIN3, MIN2 and MIN1 of the pixel data belonging to the minimum level ranges of MIN to MIN$+\Delta 4$, MIN to MIN$+\Delta 3$, MIN to MIN$+\Delta 2$ and MIN to MIN$+\Delta 1$, respectively. Representative sets of corresponding maximum and minimum average values under subtraction from each other in subtracter circuits 15A, 15B, 15C and 15D, respectively, and concealed dynamic ranges DR4, DR3, DR2 and DR1 are obtained from the subtracters 15A, 15B, 15C and 15D.

Figure 15A:
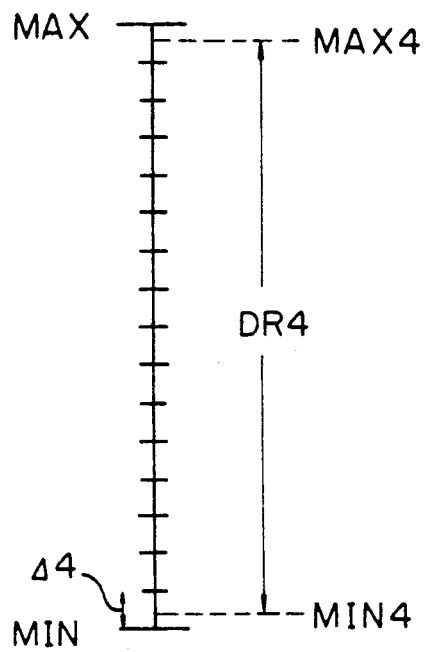
FIGS. 15A, 15B, 15C and 15D are schematic diagrams to which reference will be made in describing examples of quantization used in the embodiment of FIG. 14.
Figure 15C:
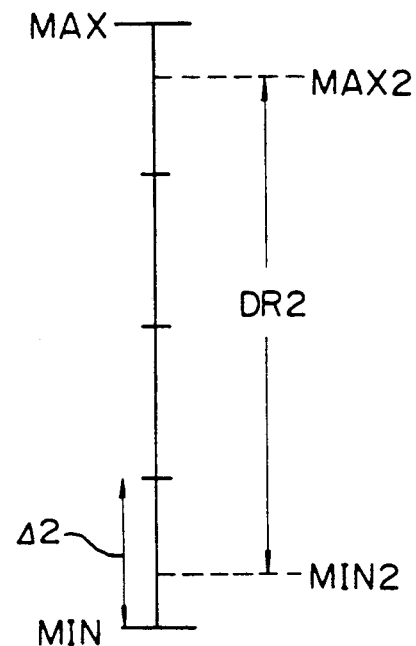
Figure 15B:
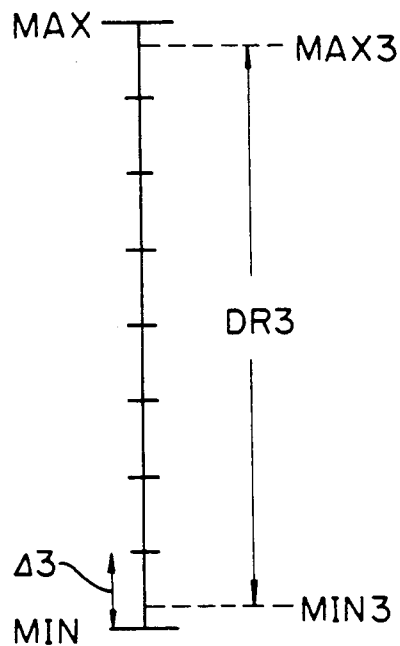
Figure 15D:
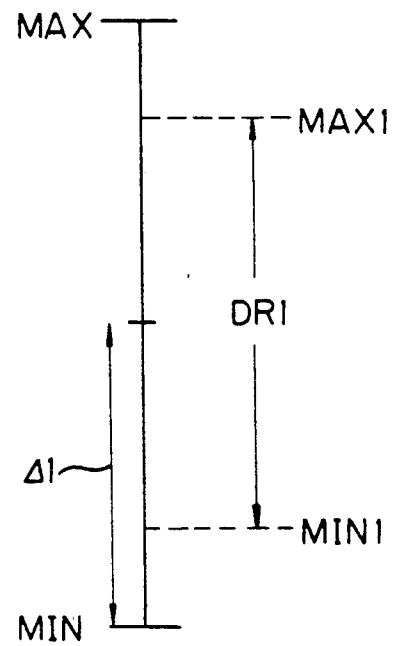

FIGS. 15A to 15D are diagrams for explaining formation of the dynamic ranges DR4, DR3, DR2 and DR1. As shown in FIG. 15A, the bit shift circuit 9A divides the original dynamic range DR into 16 equal parts and forms the quantizing step width $\Delta 4$. Average values of pixel data present in the maximum level range (MAX$-\Delta 4$) and in the minimum level range (MIN$+\Delta 4$) are used as the maximum value MAX4 and the minimum value MIN4. As shown in FIG. 15B, the bit shift circuit 9B divides the original dynamic range DR into 8 equal parts and forms the quantizing step width $\Delta 3$. Average values of pixel data present in the maximum level range (MAX$-\Delta 3$) and in the minimum level range (MIN$+\Delta 3$) are used as the maximum value MAX3 and the minimum value MIN3. Using the quantizing step width $\Delta 2$ which is formed in the bit shift circuit 9C, the maximum value MAX2 and the minimum value MIN2 are formed as shown in FIG. 15C. Using the quantizing step width $\Delta 1$ which is formed in the bit shift circuit 9D, the maximum value MAXi and the minimum value MIN1 are formed as shown in FIG. 15D.

Figure 14B:
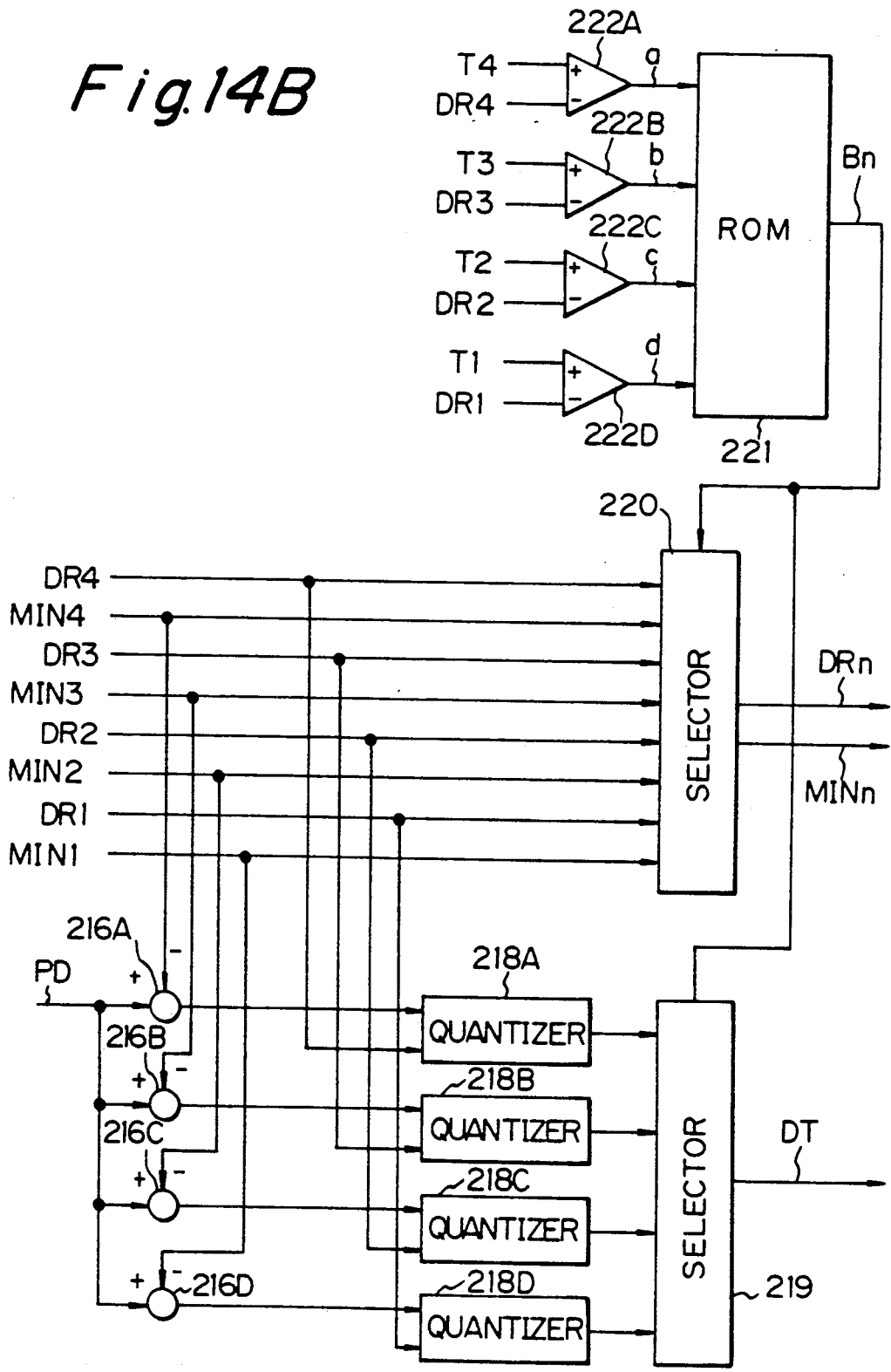

As shown in FIG. 14B, the average values MIN4, MIN3, MIN2, and MIN1 are supplied to subtracter circuits 216A, 216B, 216C and 216D which subtract the average minimum values MIN4, MIN3, MIN2, and MIN1, respectively, from the input data PD arriving through a delay circuit 17 to form data PDI after removal of the minimum values. These data PDI and the concealed dynamic ranges DR4 to DR1 are supplied to quantizer circuits 218A, 218B, 218C and 21BD, respectively. This embodiment performs edge-match quantization which is a variable-length ADRC in which the bit number n assigned to the quantization is either 0 bit (no code signal is transmitted), 1 bit, 2 bits, 3 bits or 4 bits. The quantizers 218A, 218B, 218C and 218D each consist of, for example, a ROM, and their output signals are supplied to a selector 219.

A code signal selected by the selector 219 is transmitted as a coding output DT. There is provided a further selector 220 which is supplied with the concealed dynamic ranges DR4 to DR1 and the minimum values MIN4 to MIN1. The selectors 219 and 220 are controlled by a bit number code Bn which is read out of a ROM 221. The assigned bit number n indicated by the bit number code Bn is decided for each block by the ROM 221, and the bit number code Bn is supplied to the quantizers 218A, 218B, 218C and 218D. Variable-length ADRC performs efficient coding by decreasing the assigned bit number n in a block where the dynamic range DR is smaller and by increasing the assigned bit number n is a block where the dynamic range DR is larger. More specifically, assuming that the threshold values used deciding the bit number n are T1 to T4 (T1<T2<T3<T4), no code signal is transmitted in blocks of (DR<T1), and information only as to the dynamic range DR1 is transmitted. In blocks of (T1$\leqq$DR2<T2, the bit number is set as (n=1). In blocks of (T2$\leqq$=DR3<T3, the bit number is set as (n=2). In blocks of (T3$\leqq$=DR4<T4, the bit number is set as (n=3). In blocks of (DR4 $\geqq$T4), the bit number is set as (n=4).

The ROM 221 is supplied with comparison output signals from comparator circuits 222A, 222B, 222C and 222D as addresses. The comparator 222A compares the dynamic range DR4 with the threshold value T4, the comparator 222B compares the dynamic range DR3 with the threshold value T3, the comparator 222C compares the dynamic range DR2 with the threshold value T2, and the comparator 222D compares the dynamic range DR1 with the threshold value T1. These comparators supply output signals of "1" (high level) for the condition Drn>Tn, in which n=0, 1, 2, 3 or 4. Assuming the comparison output signals of the comparators 222A, 222B, 222C and 222D are a, b, c and d, respectively, the ROM 221 produces the output signal Bn of 3 bits according to the following table.

| a  | 1 | 0 | 0 | 0 | 0 |
|----|---|---|---|---|---|
| b  | 1 | 1 | 0 | 0 | 0 |
| c  | 1 | 1 | 1 | 0 | 0 |
| d  | 1 | 1 | 1 | 1 | 0 |
| Bn | 4 | 3 | 2 | 1 | 0 |

When (Bn=4) is established, the selector 219 selects the output signal of the quantizer 218A, and the selector 220 selects DR4 and MIN4. In case of (Bn=3), the selector 219 selects the output signal of the quantizer 218B, and the selector 200 selects DR3 and MIN3. In case of (Bn=2), the selector 219 selects the output signal of the quantizer 218C, and the selector 220 selects DR2 and MIN2. In case of (Bn=1), the selector 219 selects the output signal of the quantizer 218B, and the selector 220 selects DR2 and MIN2. In case of (Bn=0), the selector 219 does not supply any code signal, and the selector 220 selectively supplies DR1 and MIN1.

The code signal DT selected by the selector 219, the dynamic range Drn and the average value MINn both selected by the selector 220, and a parameter code Pi (FIG. 14A-2) indicative of a specific set of threshold values are supplied to a frame segmentation circuit (not shown). The frame segmentation circuit performs a coding of an error correcting code, if necessary, and adds a synchronizing signal. At an output terminal of the frame segmentation circuit, transmitted data converted into serial data is taken out.

Variable-length ADRC can control the generated information amount by varying the threshold values T1 to T4, that is, by so-called buffering. Therefore, variable-length ADRC is useful in a transmission path, e.g., a digital VTR, which requires the amount of generated information for each field or each frame to be a predetermined value.

Figure 16A:
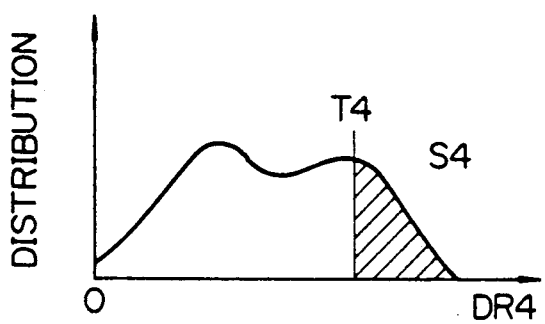
FIGS. 16A, 16B, 16C, 16D and 16E are schematic diagrams showing distribution tables of dynamic range information.

The embodiment of FIG. 14 uses distribution table generator circuits 223A, 223B, 223C and 223D as shown in FIG. 14A-2 in order to compute amounts of generated information. The distribution table generator 223A is supplied with the concealed dynamic range DR4 from the subtracter 15A. The distribution table generators 223B, 223C and 223D are similarly supplied with the dynamic ranges DR3, DR2 and DR1 from the subtracters 15B, 15C and 15D, respectively. The distribution table generator 223A creates in a memory a table corresponding to an occurrence frequency distribution graph as shown in FIG. 16A which indicates the dynamic range DR4 in the abscissa and the occurrence frequencies in the ordinate. The distribution table generators 223B, 223C and 223D similarly create, in respective memories, tables corresponding to occurrence frequency distribution graphs shown in FIGS. 16B, 16C and 16D, respectively. The occurrence frequency table is formed for each predetermined period, e.g., every frame period or every two frame periods. After the tables are formed, the distribution table generators 223A, 223B, 223C and 223D are supplied with the threshold values T4, T3, T2 and T1, respectively, from a threshold value table 224 which may be formed of a ROM.

In the threshold value table 224, plural sets e.g., 32 sets, of threshold values (T1, T2, T3 and T4) are prepared and these sets of threshold values are discriminated or identified by a parameter code Pi (i=0, 1, 2, . . . , 31). As the number i of the parameter code Pi increases, the amount of generated information decreases. However, as the generated information amount decreases, the decoded picture quality is deteriorated.

Figure 16B:
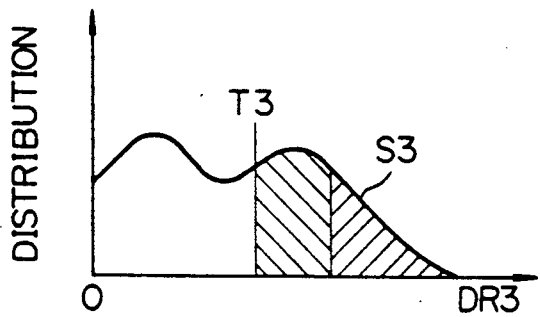
Figure 16C:
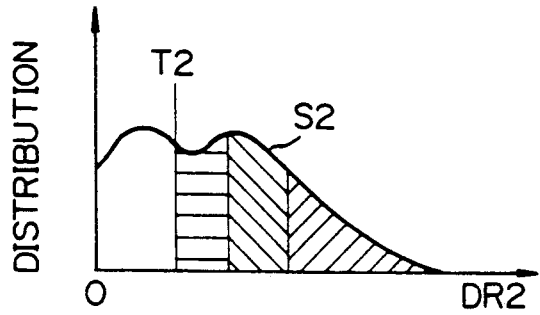
Figure 16D:
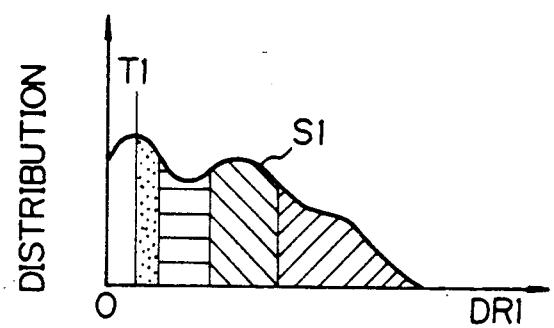

When the threshold value T4 is applied to the distribution table generator 223A, it aggregates the number of blocks including dynamic ranges DR4 larger than the threshold value T4 as shown by hatched lines in FIG. 16A, and supplies an aggregated value S4. The aggregated value S4 is the total number of blocks to which the bit number of 4 bits is assigned. When the threshold value T3 is applied to the distribution table generator 223B, it aggregates the number of blocks including dynamic ranges DR3 larger than the threshold value T3 as shown by hatched lines in FIG. 16B, and supplies an aggregated value S3. The distribution table generators 223C and 223D similarly supply aggregated values S2 and S1 of blocks including dynamic ranges larger than the threshold values T2 and T1, respectively, as shown by hatched lines in FIGS. 16C and 16D. In FIGS. 16B, 16C and 16D, regions discriminated by different threshold values are shown by different hatched lines.

The aggregated value S4 is the total number of blocks whose assigned bit number is 4 bits. The aggregated value S3 is the total number of blocks whose assigned bit number is 3 bits or more. The aggregated value S2 is the total number of blocks whose assigned bit number is 2 bits or more. The aggregated value S1 is the total number of blocks whose assigned bit number is 1 bit or more. Therefore, a value obtained by multiplying the sum of the aggregated values obtained from an adder circuit 226 by the number of picture elements in one block (64 in this embodiment) is the total of the bit numbers in a predetermined period. However, since the number of picture elements is constant, multiplication by 64 is omitted in this embodiment.

An output signal of the adder circuit 226 is supplied to a comparator circuit 227, and it is there compared with a target value from a terminal 228. When the generated information amount is equal to or less than the target value, the amount of data transmitted in a predetermined period is deemed to be within the capacity of the transmission path. An output signal of the comparator 227 is supplied to a read-out control circuit 225. The read-out control circuit 225 controls the reading of the threshold values T4 to T1 from the threshold value table 224. When, for example, there are sets of threshold values T4 to T1 stored in the threshold value table 224, they are selectively read out of the threshold value table 224 along with the parameter code Pi.

In this case, the sets of threshold values are sequentially read out, starting from a set with which the amount of generated information is increased. A set of threshold values read out at the time when the generated information amount from the adder circuit 226 comes under the target value is decided to be the optimum set. This optimum set of threshold values is supplied to the comparators 222A to 222D (FIG. 14B). Additionally, the parameter code Pi indicative of the selected set of threshold values is supplied from the table 224 to the frame segmentation circuit (not shown) and transmitted to the receiver.

Figure 16E:
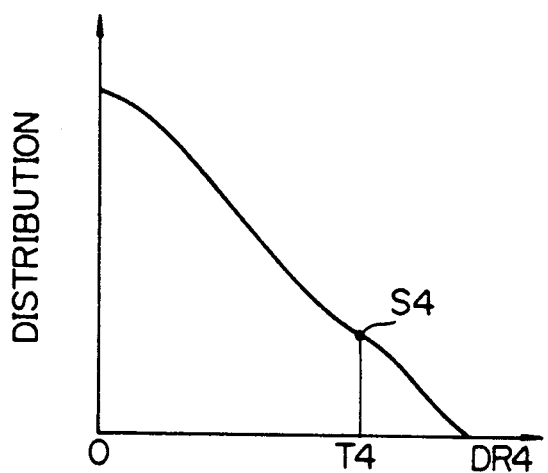

Referring to FIGS. 16A to 16D, in respect of obtaining aggregated values S4 to S1 of the number of blocks larger than the threshold values T4 to T1, the distribution table is preferably converted into an integrating type in order to ensure quick generation of the aggregated values when the threshold value is changed. Taking the distribution table of FIG. 16A as an example, an integrating type distribution table shown in FIG. 16E is obtained by sequentially integrating occurrence frequencies from the maximum value of the dynamic range DR4 toward the minimum value thereof. In the integrating type distribution table, the integrating type occurrence frequency, at the time when the threshold value T4 is given, is just the aggregated value S4. The other aggregated values S3, S2 and S1 can readily be obtained from integrating type distribution tables in the same manner.

The embodiment of FIG. 14A et seq. may be used in combination with a receiver having the same arrangement as that of FIG. 11.

According to the invention, it is possible to prevent block distortion in a block including a ringing, an impulsive noise, or the like. The invention can perform an effective coding using a variable length ADRC, and can prevent mismatching that causes the assigned bit number n to be different for the encoder and the decoder because of a difference in dynamic ranges used for control of the amount of generated information and quantization. Further, upon obtaining a new dynamic range Drn, the maximum levels MAXn and the minimum levels MINn are in the form of average values of pixel data present in the maximum level range and in the minimum level range corresponding to a specific bit number. Therefore, as compared to other systems in which the maximum level range and the minimum level range are fixed at constant values regardless of the assigned bit number, the invention can effectively prevent block distortion.

Although illustrative embodiments of the invention have been described in detail herein with reference to the accompanying drawings, it is to be noted that the invention is not limited thereto, and that various changes and modifications may be effected therein by a person skilled in the art without departing from the spirit and scope of the invention as defined in the appended claims.

What is claimed is:

1. A highly efficient coding apparatus for coding digital video data in a bock format allowing video data compression for transmission by data transmission means having a predetermined transmission capacity, said coding apparatus comprising:
   detecting means for detecting maximum and minimum values of the digital video data of plural picture elements in a block;
   first averaging means for averaging the digital video data having values between said maximum value and a first value which is a first predetermined level lower than said maximum value for generating a modified maximum value;
   second averaging means for averaging the digital video data having values between said minimum value and a second value which is a second predetermined level higher than said minimum value for generating a modified minimum value;
   means for subtracting said modified minimum value from the digital video data for each of said picture elements to generate modified digital video data;
   means for generating modified dynamic range information from said modified maximum and minimum values;
   means for determining an encoding bit number for each block during a predetermined period on the basis of said predetermined transmission capacity of said data transmission means;
   edge-match encoding means for encoding said modified digital video data with said encoding bit number; and
   means for transmitting an output of said encoding means, a first additional code for each block formed of at least two of said modified maximum and minimum values and a signal based on said modified dynamic range information, and a second additional code for each said predetermined period.

2. A high efficient coding apparatus according to claim 1; wherein said means for determining the encoding bit number includes means for generating original dynamic range information from said maximum and minimum values, means for generating a distribution table of said original dynamic range information during said predetermined period, setting means for setting a threshold value of said original dynamic range information for determining a boundary between plural bit numbers, and comparator means for comparing said original dynamic range information and said threshold value.

3. A highly efficient coding apparatus according to claim 2; further comprising means for providing said predetermined levels by bit shifting said original dynamic range information by the bit number determined by said means for determining.

4. A highly efficient coding apparatus according to claim 3; wherein said means for transmitting includes second comparator means for comparing said original and modified dynamic range informations and said threshold value and, in response thereto, generating a flag code for each block.

5. A highly efficient coding apparatus according to claim 1; wherein said means for determining the encoding bit number includes means for generating original dynamic range information from said maximum and minimum values, means for generating a distribution table of said original dynamic range information during said predetermined period, setting means for setting a threshold value of the original dynamic range information for determining a boundary between plural bit numbers, and comparator means for comparing said modified dynamic range information and said threshold value.

6. A highly efficient coding apparatus according to claim 5; further comprising means for providing said first and second predetermined levels by bit shifting said original dynamic range information by the bit number determined by said threshold value and said original dynamic range information.

7. A highly efficient coding apparatus according to claim 1; wherein said means for determining the bit number includes means for generating a distribution table of said modified dynamic range information during said predetermined period, setting means for setting a threshold value of the modified dynamic range information for determining a boundary between plural bit numbers, and comparator means for comparing said modified dynamic range information and said threshold value.

8. A highly efficient coding apparatus according to claim 7; further comprising means for providing said first and second predetermined levels by bit shifting original dynamic range information generated from said maximum and minimum values by a fixed bit number.

9. A highly efficient coding apparatus according to claim 7; wherein said first and second predetermined levels are fixed levels.

10. A highly efficient coding apparatus according to claim 1; wherein said first averaging means includes n averaging devices each of which averages the digital video data having a value between said maximum value and a value lower than said maximum value by original dynamic range information generated from said maximum and minimum values divided by $2^i (i = 1, 2, \ldots n)$, said averaging means generating n modified maximum values; said second averaging means includes n averaging devices each of which averages the digital video data having a value between said minimum value and a value higher than said minimum value by said original dynamic range information divided by $2^i (i=1, 2, \ldots n)$, said second averaging means generating n modified minimum values' said maens for generating modified dynamic range information generates n modified dynamic range informations; and said means for determining said encoding bit number includes means for generating n distribution tables from said n modified dynamic range information, setting means for setting a threshold value of the modified dynamic range information for determining a boundary between plural bit numbers, and comparator means for comparing said n modified dynamic range informations and said threshold value.

* * * * *